(12) United States Patent
Iseki et al.

(10) Patent No.: US 6,288,193 B1
(45) Date of Patent: Sep. 11, 2001

(54) ETHYLENE-BASED POLYMER

(75) Inventors: Yuki Iseki; Yasuro Suzuki, both of Chiba (JP)

(73) Assignee: Sumitomo Chemical Co., Ltd. (JP)

( * ) Notice: Subject to any disclaimer, the term of this patent is extended or adjusted under 35 U.S.C. 154(b) by 0 days.

(21) Appl. No.: 09/426,191

(22) Filed: Oct. 25, 1999

(30) Foreign Application Priority Data

Oct. 27, 1998 (JP) .................................................. 10-305384
Oct. 27, 1998 (JP) .................................................. 10-305385
Oct. 27, 1998 (JP) .................................................. 10-305386

(51) Int. Cl.$^7$ ......................... C08F 210/14; C08F 210/16
(52) U.S. Cl. ...................... 526/348.6; 526/126; 526/160; 526/161; 526/308; 526/916; 526/943; 502/117; 502/152; 502/153; 556/11; 556/12; 556/152; 556/155
(58) Field of Search ................................. 526/348.6, 916, 526/308, 160, 161, 943; 502/117, 152, 155; 556/11, 12, 52, 53

(56) References Cited

U.S. PATENT DOCUMENTS

| 6,084,046 | * | 7/2000 | Johoji et al. | 526/339 |
| 6,090,961 | * | 7/2000 | Hanaoka et al. | 556/11 |
| 6,121,401 | * | 9/2000 | Yamamoto et al. | 526/348.6 |
| 6,184,319 | * | 2/2001 | Sato et al. | 526/161 |
| 6,187,889 | * | 2/2001 | Oi et al. | 526/347 |

FOREIGN PATENT DOCUMENTS 7-70223    3/1995  (JP) .

OTHER PUBLICATIONS

Burns et al., Copolymerization of ethylene and vinylcyclohexane using soluble Ziegler–Natta catalysts, Polymer, 1993, vol. 34, No. 9.*
Mani, et al. "copolymerization of ethylene and vinylcyclohexane using soluble Ziegler–Natta catalysts", Polymer, vol. 34, No. 9 1993, pp. 1941–1945.
Hansch, et al., "Exploring QSAR Fundamentals and Applications in Chemistry Biology", chapter 3, American Chemical Society, 1995 pp. 69–96.
Dreval, et al. "Effect of the . . . Characteristics of Linear Polyethylene", Polymer Science, 1991, vol. 33, No. 11, pp. 2318–2326.

* cited by examiner

Primary Examiner—David W. Wu
Assistant Examiner—R. Harlan
(74) Attorney, Agent, or Firm—Fitch, Even, Tabin & Flannery

(57) ABSTRACT

An ethylene-based polymer comprising ethylene and at least one addition polymerizable monomer containing a vinyl compound (A) described below, wherein the ethylene-based polymer has a melting temperature (Tm) of 119 ° C. or lower and, the melt index MI (g/10 minutes) of the ethylene-based polymer and the molar content "m" (mole %) of the vinyl compound (A) satisfy the following formula (1): Vinyl compound (A): a vinyl compound represented by the structural formula $CH_2$=CH—R containing a saturated hydrocarbon group R wherein the substituent R has a steric parameter Es of not less than −2.77 and not more than −1.64 and the substituent R has a steric parameter B1 of not less than 1.53 and not more than 2.90:

$$0.01 \leq MI \leq 18 + m^{1.4} \quad (1)$$

14 Claims, No Drawings

ETHYLENE-BASED POLYMER

BACKGROUND OF THE INVENTION

1. Field of the Invention

The present invention relates to an ethylene-based polymer comprising ethylene and a vinyl compound having a substituent having specific steric parameter, an ethylene-based polymer having excellent mechanical strength property, and an ethylene-based polymer having excellent processing property and mechanical strength property, a method for producing the ethylene-based polymer, and a use thereof.

2. Description of the Related Art

Ethylene-based polymers are widely used in various fields as general resins, and required to have mechanical properties such as rigidity, impact strength and the like, for example, and excellent appearance such as transparency and the like, in addition to molding processability. Regarding a conventional linear low density polyethylene prepared by using butene-1 or hexene-1 as a copolymerization component for ethylene, increase in molecular weight and decrease in density for improving mechanical properties are proposed, however, these means are not admitted as appropriate methods since deterioration in processability due to increase in extrusion tolque in processing and decrease in heat-resistance are occurred, and there is limitation to improvement in mechanical properties.

As an ethylene-based copolymer having specific viscoelastic property, an ethylene-based copolymer prepared by using styrene or 4-vinylcyclohexene as a copolymerization component for ethylene is disclosed (Japanese Patent Application Laid-Open (JP-A) No. 7-70223). However, an ethylene-styrene copolymer is not preferable since it causes decrease in impact strength and deterioration in transparency due to inclusion of a polystyrene by-produced in production. Further, an ethylene-vinyl cyclohexene copolymer exhibits poor heat stability since it contains a double bond in a significant amount derived from 4-vinylcyclohexene, and includes problems such as occurring of fish eye due to gelling in molding process and the like.

On the other hand, an ethylene-based copolymer using vinylcyclohexane as a copolymerization component for ethylene is reported (Polymer Science (1991), vol. 33(11), p. 2318). However, it is not admitted to have excellent mechanical strength and transparency since it has wide composition distribution due to production in the presence of a Ziegler Natta catalyst system. There is also a report of production in the presence of a metallocene catalyst system (Polymer (1993), vol. 34(9), 1941/Polymer Science USSR (1990), vol. 32(9), 1868), however, it has extremely low molecular weight and therefore the mechanical strength can not be admitted as in satisfactory level.

SUMMARY OF THE INVENTION

An object of the present invention is to provide an ethylene-based polymer excellent in transparency, mechanical properties and viscoelasticity, and ethylene-based polymer having excellent mechanical strength property and an ethylene-based polymer having excellent processing property and mechanical strength property, a method for producing said polymer, and a film, sheet and molded article excellent in transparency, mechanical properties and viscoelasticity.

The present inventors have intensively studied regarding an ethylene-based polymer excellent in transparency and mechanical strength or viscoelasticity, and as a result, have found that an ethylene-based polymer prepared by using a vinyl compound having a substituent having specific steric parameter as a copolymerization component, and an ethylene-based polymer having specific melt viscosity and fusion heat quantity and having excellent balance between melt tension and impact strength achieves the object of the present invention, and have completed the present invention.

Namely, the present invention relates to an ethylene-based polymer comprising ethylene and at least one addition polymerizable monomer containing a vinyl compound (A) described below, wherein the ethylene-based polymer has a melting temperature (Tm) of 119° C. or lower and, the melt index MI (g/10 minutes) of the ethylene-based polymer and the molar content m (mol %) of the vinyl compound (A) satisfy the following formula (1):

Vinyl compound (A): a vinyl compound represented by the structural formula $CH_2=CH-R$ containing a saturated hydrocarbon group R wherein the substituent R has a steric parameter Es of not less than −2.77 and not more than −1.64 and the substituent R has a steric parameter B1 of not less than 1.53 and not more than 2.90:

$$0.01 \leq MI \leq 18 + m^{1.4} \quad (1).$$

Further, the present invention provides an ethylene-based polymer wherein the polymer has a melt viscosity $\eta^*_{190}$ at a temperature of 190° C. and at a shearing speed of 100 rad/sec in the range from $3.0 \times 10^2$ to $6.0 \times 10^3$ Pa·s, the polymer has a fusion heat quantity $\Delta H$ in the range from 70 to 145 J/g, and the tensile impact strength TI (kJ/m$^2$) and the melt tension MT (cN) at a temperature of 150° C. satisfy the following formulae (2) and (3):

$$TI \geq -31 \times \Delta H + 1.57 \times 10^4 \times \log \eta^*_{190} - 980 \quad (2),$$

$$MT < 6.2 \times 10^{-3} \times \log \eta^*_{190} - 4.3 \quad (3).$$

Furthermore, the present invention provides an ethylene-based polymer wherein the polymer has a melt viscosity $\eta^*_{190}$ at a temperature of 190° C. and at a shearing speed of 100 rad/sec in the range from $3.0 \times 10^2$ to $6.0 \times 10^3$ Pa·s, the polymer has a fusion heat quantity $\Delta H$ in the range from 70 to 145 kJ/kg, and the tensile impact strength TI (kJ/m$^2$) and the melt tension MT (cN) at a temperature of 150° C. satisfy the following formulae (4) and (5):

$$TI \geq -15 \times \Delta H + 0.76 \times 10^4 \times \log \eta^*_{190} - 470 \quad (4),$$

$$MT \geq 6.2 \times 10^{-3} \times \log \eta^*_{190} - 4.3 \quad (5).$$

The present invention will be described in detail below.

DETAILED DESCRIPTION OF THE PRACTICAL EMBODIMENTS

The ethylene-based polymer of the present invention usually means a copolymer of ethylene with an addition polymerizable monomer, and also includes an ethylene homopolymer.

The ethylene-based polymer of the present invention is an ethylene-based copolymer comprising ethylene and at least one addition polymerizable monomer containing the above-described vinyl compound (A).

The ethylene-based polymer of the present invention is preferably an ethylene-vinyl compound binary copolymer comprising ethylene and the vinyl compound (A); or an ethylene-vinyl compound-addition polymerizable monomer ternary copolymer comprising ethylene, the vinyl compound (A) and an addition polymerizable monomer other than the vinyl compound (A).

The vinyl compound (A) used as a copolymerization component in the ethylene-based polymer of the present invention is a vinyl compound which is represented by $CH_2=CH-R$ having a saturated hydrocarbon group R which has steric parameters Es and B1 in specific ranges.

The steric parameters Es and B1 herein referred to are parameters showing steric bulkiness of a substituent, and values described in a literature (C. Hansch and A. Leo: "Exploring QSAR Fundamentals and Applications in Chemistry and Biology" Chapter 3 (ACS Professional Reference Book, Washington, D.C. (1995)) are used. When the thickness value and the width value of a substituent are known, an average thereof is used.

The steric parameter Es is not less than −2.77 and not more than −1.64, preferably not less than −2.37 and not more than −1.71, more preferably not less than −2.22 and not more than −1.75, and the steric parameter B1 of the substituent R is not less than 1.53 and not more than 2.90, preferably not less than 1.70 and not more than 2.50.

In the case of a vinyl compound (A) having a saturated hydrocarbon group R having a steric parameter Es of less than −2.77, it does not form a copolymer with ethylene or formation thereof is substantially extremely difficult, and when the steric parameter Es is more than −1.64, improvement in impact strength of a copolymer is scarcely recognized. In the case of a vinyl compound (A) having a saturated hydrocarbon group R having a steric parameter B1 of less than 1.53, improvement in impact strength of a copolymer is scarcely recognized, even if the steric parameter Es is in the range of not less than −2.77 and not more than −1.64. When the steric parameter B1 is more than 2.90, it does not form a copolymer with ethylene, or formation thereof is substantially extremely difficult.

Examples of the saturated hydrocarbon group R of a vinyl compound (A) used as a copolymerization component in an ethylene-based polymer of the present invention include a cyclohexyl group, cyclopentyl group, isopropyl group, isobutyl group, 2,2-dimethylpropyl group and the like, and as the corresponding vinyl compound (A), vinylcyclohexane, vinylcyclopentane, 3-methylbutene-1,3-methylpentene-1 and the like are exemplified. Among them, vinylcyclohexane is particularly preferable.

When an addition polymerizable monomer other than the vinyl compound (A) is used as a copolymerization component of an ethylene-based polymer of the present invention, as the above-described addition polymerizable monomer, α-olefins having 3 to 20 carbon atoms or diolefins having 4 to 20 carbon atoms are listed, and specific examples thereof include propylene, 1-butene, 1-pentene, 1-hexene, 1-heptene, 1-octene, 1-nonene, 1-decene, 1-hexadecene, 1-eicosene, 4-methyl-1-pentene, 4-methyl-1-hexene, norbornene, 1,3-butadiene, 1,5-hexadiene, isoprene and the like. Among them, 1-hexene and 1-octene are preferable. An ethylene-based polymer of the present invention may contain two or more of the above-described addition polymerizable monomers other than the vinyl compound (A).

The melting temperature (Tm) of an ethylene-based polymer of the present invention is 119° C. or less, preferably is a temperature satisfying the following formula (6), more preferably is a temperature satisfying the following formula (7). The melting temperature (Tm) herein referred to means a fusion peak temperature measured in the following procedure: A differential scanning calorimeter DSC-7 type apparatus manufactured by Perkin Elmer Corp. is used, and 10 mg of a sample is packed into an aluminum pan and left for 2 minutes at 150° C. before it is cooled to 40° C. at a rate of 5° C./min., kept at 40° C. for two minutes, then, heated up to 150° C. at a rate of 5° C./min. The mark "m" means a molar content (unit: mol %) of at least one addition polymerizable monomer containing a vinyl compound (A), and calculation method thereof is described below in detail.

$$Tm \leq 119 - 0.02 \times m^2 \qquad (6)$$

$$Tm \leq 119 - 0.08 \times m^2 \qquad (7)$$

When the melting temperature (Tm) is more than 119° C., transparency deteriorates and impact strength decreases due to high crystallinity or wide composition distribution.

In an ethylene-based polymer of the present invention, the higher the molar content "m" (mol %) of at least one addition polymerizable monomer containing a vinyl compound (A), the more the impact resistance and transparency are improved or the more the viscoelasticity increases, therefore, this effect is fully retained even if the molecular weight decreases along with increase in the molar content "m". Further, it is generally known that when an ethylene-based copolymer is produced by using an addition polymerization catalyst, the more the molar content of an addition polymerizable monomer other than ethylene increases, the more the molecular weight of the copolymer decreases and the more melt index MI increases.

Accordingly, in an ethylene-based polymer of the present invention, melt index MI satisfies the formula (1), preferably satisfies the formula (8), more preferably satisfies the formula (9) The melt index MI herein referred to is measured according to JIS-K-6760-1971.

$$0.01 \leq MI \leq 18 + m^{1.4} \qquad (1)$$

$$0.05 \leq MI \leq 17 + m^{1.2} \qquad (8)$$

$$0.10 \leq MI \leq 15 + m \qquad (9)$$

When the right inequality in the formula (1) is not satisfied, impact strength and transparency decrease remarkably, and when the left inequality in the formula (1) is not satisfied, melt viscosity is high and extrusion processing becomes extremely difficult.

The molar content "m" (mol %) of at least one addition polymerizable monomer containing a vinyl compound (A) constituting an ethylene-based polymer of the present invention is preferably from 0.8 to 60 mol %, more preferably from 1 to 40 mol %, further preferably from 1 to 20 mol %, most preferably from 1 to 15 mol %. When the molar content "m" is in the range from 0.8 to 20 mol %, impact strength and transparency are remarkably excellent, and in the range from 10 to 60 mol %, viscoelastic effect is remarkable.

The ratio of the molar content "$m_A$" of a vinyl compound (A) constituting an ethylene-based polymer of the present invention to the molar content "m" of an addition polymerizable monomer containing the vinyl compound (A) ($m_A/m$) is preferably from 0.05 to 1.0, more preferably from 0.10 to 1.0, most preferably from 0.15 to 1.0.

The ethylene-based polymer of the present invention is an ethylene-based polymer in which the melt viscosity $\eta^*_{190}$ at a temperature of 190° C. and at a shearing speed of 100 rad/sec is in the range from $3.0 \times 10^2$ to $6.0 \times 10^3$ Pa·s, the fusion heat quantity ΔH is in the range from 70 to 145 kJ/kg, and the tensile impact strength TI (kJ/m$^2$) and the melt tension MT (cN) at a temperature of 150° C. satisfy the following formulae (2) and (3):

$$TI \geq -31 \times \Delta H + 1.57 \times 10^4 \times \log \eta^*_{190} - 980 \quad (2),$$

$$MT < 6.2 \times 10^{-3} \times \log \eta^*_{190} - 4.3 \quad (3).$$

The melt viscosity $\eta^*_{190}$ here in referred to means a value obtained by measurement under the following conditions, and can be regarded as an index for extrusion torque in processing.

Apparatus: Reometrics Mechanical Spectrometer RMS-800 manufactured by Reometrics Geometry: parallel plate, diameter: 0.025 m, plate interval: 0.0015 to 0.002 m Strain: 5%

Shearing speed: 100 rad/sec

Temperature: 190° C.

The melt viscosity $\eta^*_{190}$ is preferably not less than $5.0 \times 10^2$ Pa·s and not more than $5.0 \times 10^3$ Pa·s, more preferably not less than $7.0 \times 10^2$ Pa·s and not more than $3.0 \times 10^3$ Pa ·s. When the melt viscosity $\eta^*_{190}$ is less than $3.0 \times 10^2$ pa·s, molding processability deteriorates by decrease in melt tension. When the melt viscosity $\eta^*_{190}$ is more than $6.0 \times 10^3$ Pa·s, extrusion torque is extremely high and molding processability deteriorates.

The fusion heat quantity $\Delta H$ is not less than 70 kJ/kg and not more than 145 kJ/kg. The fusion heat quantity $\Delta H$ herein referred to means the whole absorption heat quantity from 42° C. to the complete fusion temperature when a differential scanning calorimeter DSC-7 type apparatus manufactured by Perkin Elmer Corp. is used, and 0.000010kg of a sample is packed into an aluminum pan and left for 2 minutes at 150° C. before it is cooled to 40° C. at a rate of 5° C./min., kept at 40° C. for two minutes, then, heated up to 150° C. at a rate of 5° C./min.

The fusion heat quantity $\Delta H$ is preferably not less than 80 kj/kg and not more than 135 kJ/kg, more preferably not less than 95 kJ/kg and not more than 125 kJ/kg. When the fusion heat quantity $\Delta H$ is less than 70 kJ/kg, rigidity decreases to practically unsuitable level When the fusion heat quantity $\Delta H$ is more than 145 kJ/kg, impact resistance decreases and practically required strength is not accomplished.

The tensile impact strength TI (kJ/m$^2$) satisfies the relation represented by the following formula (2). The tensile impact strength TI herein referred4 to is measured according to ASTM D1822-68.

TI preferably satisfies the formula (10), more preferably satisfies the formula (11). When TI does not satisfy the formula (2), the mechanical property can not be admitted as excellent.

$$TI \geq -31 \times \Delta H + 1.5 \times 10^{4 \times \log \eta^*_{190}} - 980 \quad (2)$$

$$TI \geq -32 \times \Delta H + 1.62 \times 10^{4 \times \log \eta^*_{190}} - 1010 \quad (10)$$

$$TI \geq -34 \times \Delta H + 1.72 \times 10^{4 \times \log \eta^*_{190}} - 1070 \quad (11)$$

The melt tension MT (cN) at 150° C. satisfies the relation represented by the following formula (3). The melt tension MT herein referred to means a tension value measured when a melt tension tester manufactured by Toyo Seiki Seisakusho K. K. is used and a melt resin extruded through an orifice having a diameter of 2.09 mm $\phi$ and a length of 8 mm by a piston operated at a lowering speed of 0.0055 m/min. at 150° C. is wound at a winding raising speed of 40 rpm/min.

$$MT < 6.2 \times 10^{-3} \times \log \eta^*_{190} - 4.3 \quad (3)$$

The above-described ethylene-based polymer can be obtained, for example, by copolymerizing ethylene with the above-described vinyl compound (A). Examples of the vinyl compound (A) include vinylcyclohexane, vinylcyclopentane, 3-methyl-1-butene, 3-methyl-1-pentene, 3,3-dimethyl-1-butene, 3,5,5-trimethyl-1-hexene, 3-ethyl-1-pentene, 3-butyl-1-hexene, vinyltrimethylsilane, 3-chloro-1-butene, 3-bromo-1-butene, 3-methoxy-1-butene, 3-ethoxy-1-butene, 3,3-dichloro-1-butene, 3,3-difluoro-1-butene, 3,3,3-trifluoropropylene, 3-hydroxy-3-methyl-1-butene, 3,4-dihydroxy-1-butene, 3-cyano-3-methyl-1-butene, styrene and the like. Among them, hydrocarbon groups such as vinylcyclohexane, vinylcyclopentane, 3-methyl-1-butene, 3-methyl-1-pentene, 3,3-dimethyl-1-butene, 3,5,5-trimethyl-1-hexene, 3-ethyl-1-pentene, 3-butyl-1-hexene, styrene and the like are preferable, and saturated hydrocarbon groups such as vinylcyclohexane, vinylcyclopentane, 3-methyl-1-butene, 3-methyl-1-pentene, 3,3-dimethyl-1-butene, 3,5,5-trimethyl-1-hexene, 3-ethyl-1-pentene, 3-butyl-1-hexene and the like are more preferable, and particularly, vinylcyclohexane is most preferable.

As an addition polymerizable monomer used as a copolymerization component in addition to the above-described vinyl compound (A) having a bulky substituent, $\alpha$-olefins having 3 to 20 carbon atoms or diolefins having 4 to 20 carbon atoms are listed, and examples thereof include propylene, 1-butene, 1-pentene, 1-hexene, 1-heptene, 1-octene, 1-nonene, 1-decene, 1-hexadecene, 1-eicosene, 4-methyl-1-pentene, 4-methyl-1-hexene, norbornene, 1,3-butadiene, 1,5-hexadiene, 1,7-octadiene, 1,9-decadiene, isoprene and the like, and one or more of them may be used simultaneously with the vinyl compound (A) having a bulky substituent.

The above-described two ethylene-based polymers are preferably produced in the presence of a catalyst comprising a transition metal compound, particularly, a catalyst comprising a transition metal compound having indenyl-type anion skeleton, or cross-linked cyclopentadiene-type anion skeleton.

Examples of the cyclopentadiene-type anion skeleton include $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-pentamethylcyclopentadienyl group, $\eta^5$-indenyl group, $\eta^5$-methylindenyl group, $\eta^5$-dimethylindenyl group, $\eta^5$-ethylindenyl group, $\eta^5$-propylindenyl group, $\eta^5$-isopropylindenyl group, $\eta^5$-n-butylindenyl group, $\eta^5$-4,5,6,7-tetraindenyl group, $\eta^5$-fluorenyl group, $\eta^5$-methylfluorenyl group, $\eta^5$-dimethylfluorenyl group and the like. As the indenyl-type anion skeleton, there are listed, among the above-described groups, for example $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$isopropylindenyl group, $\eta^5$-n-butylindenyl group, $\eta^5$-4,5,6,7-tetrahydroindenyl group, $\eta^5$-fluorenyl group, $\eta^5$-methylfluorenyl group, $\eta^5$-dimethylfluorenyl group and the like.

The above-described transition metal compounds are so-called metallocene-based compounds, and usually represented by the general formula $ML_aX_{n-a}$ (wherein, M represents a transition metal atom in IV group or lanthanoid series in the periodic table of element. L represents a group having cyclopentadiene-type anion skeleton or a group containing a hetero atom, and at least one is a group having cyclopentadiene-type anion skeleton. Though a plurality of Ls are usually cross-linked mutually, particularly when Ls represent indenyl-type anion skeletons, they may not be cross-linked. X represents a halogen atom, hydrogen or hydrocarbon group having 1to 20carbon atoms. "n" represents valency of a transition metal atom, and "a" represents an integer satisfying the relation o<a≦n.), and can be used alone or in combination of two or more.

Among metallocene-based compounds represented by the above-described general formula $ML_aX_{n-a}$, specific examples of compounds in which M represents zirconium include ethylenebis (cyclopentadienyl)zirconium dichloride, ethylenebis (cyclopentadienyl)zirconium dibromide, ethylenebis (cyclopentadienyl)zirconium dimethyl, ethylenebis (methylcyclopentadienyl)zirconium dichloride, ethylenebis (pentamethylcyclopentadienyl)zirconium dichloride, isopropylidenebis (cyclopentadienyl)zirconium dichloride, bis (indenyl)zirconium dichloride, bis(indenyl)zirconium dibromide, bis (indenyl)zirconium dimethyl bis(4,5,6,7-tetrahydroindenyl)zirconium dichloride, bis (4,5,6,7-tetrahydroindenyl)zirconium dibromide, bis(4,5,6,7-tetrahydroindenyl)zirconium dimethyl, bisc(fluorenyl) zirconium dichloride, bis (fluorenyl)zirconium dibromide, bis (fluorenyl)zirconium dimethyl, ethylenebis (indenyl) zirconium dichloride, ethylenebis (indenyl)zirconium dibromide, ethylenebis (inderenyl)zirconium dimethyl, ethylenebis (4,5,6,7-tetrahydroindenyl)zirconium dichloride, isopropylidene(cyclopentadienyl-fluorenyl) zirconium dichloride, dimethylsilylenebis (cyclopentadienyl) zirconium dichloride, dimethylsilylenebis (indenyl) zirconium dichloride, dimethylsilylenebis (4,5,6,7-tetrahydroindenyl)zirconium dichloride, dimethylsilylene (cyclopentadienyl-fluorenyl) zirconium dichloride, diphenylsilylenebis (indenyl)zirconium dichloride, cyclopentadienyldimethylaminozirconium dichloride, cyclopentadienylphenoxyzirconium dichloride, dimethylsilylene (tert-butylamino) (tetramethylcyclopentadienyl)zirconium dichloride, dimethylsilylene(n-butylamino) (tetramethylcyclopentadienyl)zirconium dichloride and the like. There can be exemplified metallocene-based compounds substituted by titanium, hafnium and the like, in addition to zirconium, as the transition metal atom M. Bis(cyclopentadienyl)zirconium dichloride, bis(tert-butylcyclopentadienyl)zirconium dichloride are not preferable since they give ethylene-based copolymers having low molecular weights.

The ethylene-based polymer of the present invention is an ethylene-based polymer in which the melt viscosity $\eta^*_{190}$ at a temperature of 190° C. and at a shearing speed of 100 rad/sec is in the range from $3.0\times10^2$ to $6.0\times10^3$ Pa·s, the fusion heat quantity ΔH is in the range from 70 to 145 kJ/kg, and the tensile impact strength TI ($kJ/m^2$) and the melt tension MT (cN) at a temperature of 150° C. satisfy the following formulae (4) and (5):

$$TI \geq -15\times\Delta H + 0.76\times10^4\times\log \eta^*_{190} - 470 \quad (4)$$

$$MT < 6.2\times10^{-3}\times\log \eta^*_{190} - 4.3 \quad (5)$$

The melt viscosity $\eta^*_{190}$ is not less than $3.0\times10^2$ Pa·s and not more than $6.0\times10^3$ Pa·s, preferably not less than $50\times10^2$ Pa·s and not more than $4.0\times10^3$Pa·s, more preferably not less than $6.0\times10^2$ Pa·s and not more than $2.5\times10^3$ Pa·s. When the melt viscosity $\eta^*_{190}$ is less than $3.0\times10^2$ Pa·s, molding processability deteriorates by decrease in melt tension. When the melt viscosity $\eta^*_{190}$ is more than $6.0\times10^3$ Pa·s, extrusion torque is extremely high and molding processability deteriorates.

The fusion heat quantity ΔH is not less than 70 kJ/kg and not more than 145 kJ/kg. The fusion heat quantity ΔH is preferably not less than 80 kJ/kg and not more than 135 kJ/kg, further preferably not less than 95 kJ/kg and not more than 125 kJ/kg. When the fusion heat quantity ΔH is less than 70 kJ/kg, rigidity decreases to practically unsuitable level. When the fusion heat quantity ΔH is more than 145 kJ/kg, impact resistance decreases and practically required strength is not accomplished.

The tensile impact strength TI ($kJ/m^2$) satisfies the following formula (4). TI preferably satisfies the following formula (12) more preferably satisfies the following formula (13). When TI does not satisfy the formula (4), the mechanical property can not be admitted as excellent.

$$TI \geq -15\times\Delta H + 0.76\times10^4\times\log \eta^*_{190} - 470 \quad (4)$$

$$TI \geq -18\times\Delta H + 0.91\times10^4\times\log \eta^*_{190} - 570 \quad (12)$$

$$TI \geq -20\times\Delta H + 1.01\times10^4\times\log \eta^*_{190} - 630 \quad (13)$$

The melt tension MT (cN) at 150° C. satisfies the following formula (5). The melt tension MT herein referred to means a tension value measured when a melt tension tester manufactured by Toyo Seiki Seisakusho K.K. is used and a melt resin extruded through an orifice having a diameter of 0.00209 m φ and a length of 0.008 m by a piston operated at a lowering speed of 0.0055 m/min. at 150° C. is wound at a winding raising speed of 40 rpm/min.

MT preferably satisfied the following formula (14), more preferably satisfied the following formula (15). When MT does not satisfy the formula (5), melting processability is not sufficient due to low melt tension.

$$MT \geq 6.2\times10^{-3}\times\log \eta^*_{190} - 4.3 \quad (5)$$

$$MT \geq 7.0\times10^{-3}\times\log \eta^*_{190} - 4.9 \quad (14)$$

$$MT \geq 7.9\times10^{-3}\times\log \eta^*_{190} - 5.5 \quad (15)$$

The above-described ethylene-based polymer can be obtained, for example, by copolymerizing ethylene with the above-described vinyl compound (A). Examples of the vinyl compound (A) include vinylcyclohexane, vinylcyclopentane, 3-methyl-1-butene, 3-methyl-1-pentene, 3,3-dimethyl-1-butene, 3,5,5-trimethyl-1-hexene, 3-ethyl-1-pentene, 3-butyl-1-hexene, vinyltrimethylsilane, 3-chloro-1-butene, 3-bromo-1-butene, 3-methoxy-1-butene, 3-ethoxy-1-butene, 3,3-dichloro-1-butene, 3,3-difluoro-1-butene, 3,3, 3-trifluoropropylene, 3-hydroxy-3-methyl-1-butene, 3,4-dihydroxy-1-butene, 3-cyano-3-methyl-1-butene, styrene and the like. Among them, hydrocarbon groups such as vinylcyclohexane, vinylcyclopentane, 3-methyl-1-butene, 3-methyl-1-pentene, 3,3-dimethyl-1-butene, 3,5,5-trimethyl-1-hexene, 3-ethyl-1-pentene, 3-butyl-1-hexene, styrene and the like are preferable, and saturated hydrocarbon groups such as vinylcyclohexane, vinylcyclopentane, 3-methyl-1-butene, 3-methyl-1-pentene, 3,3-dimethyl-1-butene, 3,5,5-trimethyl-1-hexene, 3-ethyl-1-pentene, 3-butyl-1-hexene and the like are more preferable, and particularly, vinylcyclohexane is most preferable.

As an addition polymerizable monomer used as a copolymerization component in addition to the above-described vinyl compound (A) having a bulky substituent, α-olefins having 3 to 20 carbon atoms or diolefins having 4 to 20 carbon atoms are listed, and examples thereof include propylene, 1-butene, 1-pentene, 1-hexene, 1-heptene, 1-octene, 1-nonene, 1-decene, 1-hexadecene, 1-eicosene, 4-methyl-1-pentene, 4-methyl-1-hexene, norbornene, 1,3-butadiene, 1,5-hexadiene, 1,7-octadiene, 1,9-decadiene, isoprene and the like, and one or more of them may be used simultaneously with the vinyl compound (A) having a bulky substituent.

The above-described ethylene-based polymer can be obtained, for example, by copolymerizing ethylene, an α-olefin having 6 to 20 carbon atoms and a diolefin having 6 to 20 carbon atoms. Examples of the α-olefin having 6 to 20 carbon atoms include 1-hexene, 1-heptene, 1-octene, 1-nonene, 1-decene, 1-hexadecene, 1-eicosene, 4-methyl-1-pentene, 4-methyl-1-hexene and the like, and examples of the diolef in having 6 to 20 carbon atoms include 1,5-hexadiene, 1,7-octadiene, 1,9-decadiene and the like.

The molecular weight distribution Mw/Mn of all ethylene-based polymers of the present invention is preferably from 1.5 to 5.0, more preferably from 1.6 to 3.5, most preferably from 1.6 to 2.5. The molecular weight distribution Mw/Mn herein referred to means a molecular weight ratio Mw/Mn obtained by dividing a weight average molecular weight Mw in terms of styrene by a number average molecular weight Mn obtained under the following conditions.

Apparatus: Waters 150° C. manufactured by Waters Co.
Separation column: TOSOH TSKgelGMH-HT
Measuring temperature: 145° C.
Carrier: ortho dichloroethane
Flow rate: 0.0000010m$^3$/min
Injection amount: 500 μL The above-described ethylene-based polymer is preferably produced in the presence of a catalyst comprising a transition metal compound, particularly, a catalyst composed of a transition metal compound having cyclopentadiene-type anion skeleton.

Examples of the cyclopentadiene-type anion skeleton include η$^5$-cyclopentadienyl group, η$^5$-methylcyclopentadienyl group, η$^5$-dimethylcyclopentadienyl group, η$^5$-trimethylcyclopentadienyl group, η$^5$-ethylcyclopentadienyl group, η$^5$-n-propylcyclopentadienyl group, η$^5$-isopropylcyclopentadienyl group, η$^5$-butylcyclopentadienyl group, η$^5$-pentamethylcyclopentadienyl group, η$^5$-indenyl group, η$^5$-methylindenyl group, η$^5$-dimethylindenyl group, η$^5$-ethylindenyl group, η$^5$-propylindenyl group, η$^5$-isopropylindenyl group, η$^5$-n-butylindenyl group, η$^5$-4,5,6,7-tetraindenyl group, η$^5$-fluorenyl group, η$^5$-methylfluorenyl group, η$^5$-dimethylfluorenyl group and the like.

The above-described transition metal compounds are so-called metallocene-based compounds, and usually represented by the general formula $ML_aX_{n-a}$ (wherein, M represents a transition metal atom in IV group or lanthanoid series in the periodic table of element. L represents a group having cyclopentadiene-type anion skeleton or a group containing a hetero atom, and at least one is a group having cyclopentadiene-type anion skeleton. Though a plurality of Ls are usually cross-linked mutually, particularly when Ls represent indenyl-type anion skeletons, they may not be cross-linked. X represents a halogen atom, hydrogen or hydrocarbon group having 1 to20carbon atoms. "n" represents valency of a transition metal atom, and "a" represents an integer satisfying the relation o<a≦n.), and can be used alone or in combination of two or more.

Among metallocene-based compounds represented by the above-described general formula $ML_aX_{n-a}$, specific examples of compounds in which M represents zirconium include bis(cyclopentadienyl)zirconium dichloride, bis (methylcyclopentadienyl)zirconium dichloride, bis (ethylcyclopentadienyl)zirconium dichloride, bis (butylcyclopentadienyl)zirconium dichloride, bis (tert-butylcyclopentadienyl)zirconium dichloride, bis (dimethylcyclopentadienyl)zirconium dichloride, bis (pentamethylcyclopentadienyl)zirconium dichloride, ethylenebis (cyclopentadienyl)zirconium dichloride, ethylenebis (cyclopentadienyl)zirconium dibromide, ethylenebis (cyclopentadienyl)zirconium dimethyl, ethylenebis (methylcyclopentadienyl)zirconium dichloride, ethyl enebis (pentamnethylcyclopentadieyly)zirconium dichloride, isopropylidenebis (cyclopentadienyl)zirconium dichloride, bis (indenyl)zirconium dichloride, bis (indenyl)zirconium dibromide, bis (indenyl)zirconium dimethyl, bis (4,5,6,7-tetrahydroindenyl)zirconium dichloride, bis (4,5,6,7-tetrahydroindenyl)zirconium dibromide, bis (4,5,6,7-tetrahydroindenyl)zirconium dimethyl, bis (fluorenyl) zirconium dichloride, bis (fluorenyl)zirconium dibromide, bis (fluorenyl)zirconium dimethyl, ethylenebis (indenyl) zirconium dichloride, ethylenebis (indenyl)zirconium dibromide, ethylenebis (indenyl)zirconium dimethyl, ethylenebis (4,5,6,7-tetrahydroindenyl)zirconium dichloride, isopropylidene(cyclopentadienyl-fluorenyl) zirconium dichloride, dimethylsilylenebis (cyclopentadienyl) zirconium dichloride, dimethylsilylenebis (indenyl) zirconium dichloride, dimethylsilylenebis(4,5,6,7-tetrahydroindenyl)zirconium dichloride, dimethylsilylene (cyclopentadienyl-fluorenyl) zirconium dichloride, diphenylsilylenebis(indenyl)zirconium dichloride, cyclopentadienyldimethylaminozirconium dichloride, cyclopentadienylphenoxyzirconium dichloride, dimethylsilylene (tert-butylamino) (tetramethylcyclopentadienyl)zirconium dichloride, dimethylsilylene(n-butylamino) (tetramethylcyclopentadienyl)zirconium dichloride and the like. There can be exemplified metallocene-based compounds substituted by titanium, hafnium and the like, in addition to zirconium, as the transition metal atom M.

All ethylene-based polymers of the present invention are more preferably produced in the presence of a catalyst comprising particularly a transition metal complex represented by the following general formula [I], [II] or [III] among metallocene-based compounds represented by the above-described general formula $ML_aX_{n-a}$.

(A): at least one transition metal complex represented by the following formula [I], [II] or [III]:

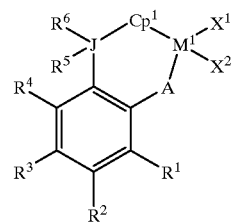

[I]

-continued

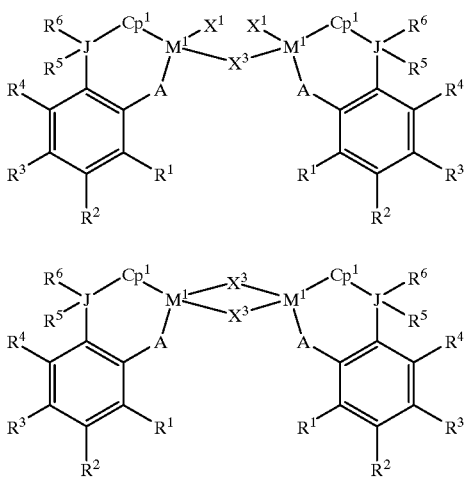

[II]

[III]

wherein $M^1$ represents a transition metal atom of group IV in the Periodic Table of the Elements; A represents an atom of group XVI in the Periodic Table of the Elements; J represents an atom of group XIV in the Periodic Table of the Elements; $Cp^1$ represents a group having a cyclopentadiene type anion skeleton; $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxy group, an aralkyloxy group, an aryloxy group, or a disubstiuted amino group; and $R^1$, $R^2$, $R^3$, $R^4$, $R^5$ and $R^6$ may be combined optionally to form a ring.

$X^3$ represents an atom of group XVI in the Periodic Table of Elements; Two of $M^1$, A, J, $Cp^1$, $X^1$, $X^2$, $X^3$, $R^1$, $R^2$, $R^3$, $R^4$, $R^5$ and $R^6$ may be the same or different:

(A) Transition metal complex is explained.

In the general formula [I], [II] and [III], the transition metal atom represented by $M^1$ is a transition metal element of group IV in the Periodic Table of the Elements (Revised Version 1989 of IUPAC, Inorganic Chemistry Nomenclature) and examples thereof include a titanium atom, a zirconium atom, a hafnium atom, or the like, preferably a titanium atom or a zirconium atom.

Examples of the atom of the group XVI in the Periodic Table of the element represented by "A" in the general formula [I], [II] or [III] include an oxygen atom, a sulfur atom, a selenium atom, etc., and preferably an oxygen atom.

Examples of the atom of group XIV in the Periodic Table of the element represented by "J" in the general formula [I], [II] or [III] include a carbon atom, a silicon atom, a germanium atom and the like, preferably a carbon atom or a silicon atom.

Examples of the group having a cyclopentadiene type anion skeleton represented by the substituent $Cp^1$ include a $\eta^5$-(substituted)cyclopentadienyl group, $\eta^5$-(substituted) indenyl group, $\eta^5$-(substituted)fluorenyl group, etc. Examples thereof are $\eta^5$-cyclopentadienyl group, $\eta^5$-methylcyclopentadienyl group, $\eta^5$-dimethylcyclopentadienyl tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, n5-n-octylcyclopentadienyl group, $\eta^5$-n-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-di-phenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc., preferably a $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group.

Examples of the halogen atom in the substituents $X^1$, $X^2$, $R^1$, $R^2$, $R^3$, $R^4$, $R^5$ and $R^6$ include a fluorine atom, chlorine atom, bromine atom, iodine atom and the like, preferably a chlorine atom or a bromine atom, more preferably a chlorine atom.

As the alkyl group in the substituents $X^1$, $X^2$, $R^1$, $R^2$, $R^3$, $R^4$, $R^5$ and $R^6$, an alkyl group having carbon atoms of 1–20 in is preferable. Examples of such an alkyl group include methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, n-eicosyl group, etc., preferably a methyl group, ethyl group, isopropyl group, tert-butyl group or amyl group.

These alkyl groups may be substituted with a halogen atom such as a fluorine atom, chlorine atom, bromine atom, iodine atom or the like. Examples of alkyl groups having 1–20 carbon atoms substituted with halogen atom(s) include a fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group or the like.

These alkyl groups may be partially substituted by an alkoxy group such as a methoxy group, ethoxy group, an aryloxy group (such as phenoxy group), or aralkyloxy group (such as benzyloxy group), etc.

As the aralkyl group in the substituents $X^1$, $X^2$, $R^1$, $R^2$, $R^3$, $R^4$, $R^5$ and $R^6$, an aralkyl group having 7–20 carbon atoms is preferable. Examples of such aralkyl groups include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc., and preferably a benzyl group.

These aralkyl groups may be partially substituted with a halogen atom such as a fluorine atom, chlorine atom, bromine atom, iodine atom, alkoxy group such as a methoxy, ethoxy, aryloxy group (such as phenoxy), or aralkyloxy group (such as benzyloxy), or the like.

As the aryl group in the substituents $X^1$, $X^2$, $R^1$, $R^2$, $R^3$, $R^4$, $R^5$ and $R^6$, the aryl group having 6–20 carbon atoms is preferable. Examples of such aryl groups include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., and preferably a phenyl group.

These aryl groups may be partially substituted with a halogen atom such as fluorine atom, chlorine atom, bromine atom, iodine atom, alkoxy group such as a methoxy, ethoxy, aryloxy group (such as phenoxy), or aralkyloxy group (such as benzyloxy), and the like.

The substituted silyl group in the substituents $X^1$, $X^2$, $R^1$, $R^2$, $R^3$, $R^4$, $R^5$ and $R^6$ is a silyl group substituted with a hydrocarbon group, and examples of the hydrocarbon group include an alkyl group having 1–10 carbon atoms such as methyl group, ethyl group, n-propyl group, isopropyl group, n-butyl group, sec-butyl group, tert-butyl group, isobutyl group, n-pentyl group, n-hexyl group, cyclohexyl group, etc.; and an aryl group (such as phenyl group), etc. Examples of the substituted silyl group having 1–20 carbon atoms include a monosubstituted silyl group having 1–20 carbon atoms such as amethylsilyl group, ethylsilyl group, phenylsilyl group, etc.; a disubsituted silyl group having 2–20 carbon atoms such as dimethylsilyl group, diethylsilyl group, diphenylsilyl group, etc.; and a trisubstituted silyl group having 3–20 carbon atoms such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., and preferably a trimethylsilyl group, tert-butyldimethylsilyl group or triphenylsilyl group.

The hydrocarbon group of these substituted silyl groups may be substituted with a halogen atom such as a fluorine atom, chlorine atom, bromine atom, iodine atom and the like; and/or an alkoxy group such as methoxy, ethoxy, aryloxy group (such as phenoxy), or aralkyloxy group (such as benzyloxy), and the like.

With respect to the alkoxy group in the substituents $X^1$, $X^2$, $R^1$, $R^2$, $R^3$, $R^4$, $R^5$ and $R^6$, an alkoxy group having 1–20 carbon atoms is preferable. Examples of such alkoxy groups include a methoxy group, ethoxy group, n-propoxy group, isopropoxy group, n-butoxy group, sec-butoxy group, t-butoxy group, n-pentoxy group, neopentoxy group, n-hexoxy group, n-octoxy group, n-dodecoxy group, n-pentadecoxy group, n-eicosoxy group, etc., and preferably a methoxy group, ethoxy group or t-butoxy group.

These alkoxy groups may be partially substituted with a halogen atom such as a fluorine atom, chlorine atom, bromine atom, iodine atom and the like; an alkoxy group such as methoxy, ethoxy, aryloxy group (such as phenoxy), or aralkyloxy group (such as benzyloxy), and the like.

With respect to the aralkyloxy group in the substituents $X^1$, $X^2$, $R^1$, $R^2$, $R^3$, $R^4$, $R^5$ and $R^6$, an aralkyloxy group having 7–20 carbon atoms is preferable. Examples of the aralkyloxy group include a benzyloxy group, (2-methylphenyl) methoxy group, (3-methylphenyl) methoxy group, (4-methylphenyl) methoxy group, (2,3-dimethylphenyl) methoxy group, (2,4-dimethylphenyl) methoxy group, (2,5-dimethylphenyl) methoxy group, (2,6-dimethylphenyl) methoxy group, (3,4-dimethylphenyl) methoxy group, (3,5-dimethylphenyl) methoxy group, (2,3,4-trimethylphenyl) methoxy group, (2,3,5-trimethylphenyl) methoxy group, (2,3,6-trimethylphenyl) methoxy group, (2,4,5-trimethylphenyl) methoxy group, (2,4,6-trimethylphenyl) methoxy group, (3,4,5-trimethylphenyl) methoxy group, (2,3,4,5-tetramethylphenyl) methoxy group, (2,3,4,6-tetramethylphenyl) methoxy group, (2,3,5,6-tetramethylphenyl) methoxy group, (pentamethylphenyl) methoxy group, (ethylphenyl) methoxy group, (n-propylphenyl) methoxy group, (isopropylphenyl) methoxy group, (n-butylphenyl) methoxy group, (sec-butylphenyl) methoxy group, (tert-butylphenyl) methoxy group, (n-hexylphenyl) methoxy group, (n-octylphenyl) methoxy group, (n-decylphenyl) methoxy group, (n-tetradecylphenyl) methoxy group, naphthylmethoxy group, anthracenylmethoxy group, etc., and preferably a benzyloxy group.

These aralkyloxy groups may be partially substituted with a halogen atom such as fluorine atom, chlorine atom, bromine atom, iodine atom and the like; an alkoxy group such as methoxy, ethoxy, aryloxy group (such as phenoxy), an aralkyloxy group (such as benzyloxy), and the like.

Examples of the aryloxy group in the substituents $X^1$, $X^2$, $R^1$, $R^2$, $R^3$, $R^4$, $R^5$ and $R^6$ include an aryloxy group having 6–20 carbon atoms such as a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxygroup, 2,3,4,6-tetramethylphenoxy group, 2,3,5,6-tetramethylphenoxy group, pentamethylphenyloxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group and the like.

These aryloxy groups may be partially substituted with a halogen atom such as a fluorine atom, chlorine atom, bromine atom, iodine atom and the like, an alkoxy group such as methoxy, ethoxy, aryloxy group (such as phenoxy), or an aralkyloxy group (such as benzyloxy), and the like.

The disubstituted amino group in the substituents $X^1$, $X^2$, $R^1$, $R^2$, $R^3$, $R^4$, $R^5$ and $R^6$ is an amino group substituted with two hydrocarbon groups. Examples of the hydrocarbon group include an alkyl group having 1–10 carbon atoms such as a methyl group, ethyl group, n-propyl group, isopropyl group, n-butyl group, sec-butyl group, tert-butyl group, isobutyl group, n-pentyl group, n-hexyl group, cyclohexyl group, etc.; an aryl group having 6–10 carbon atoms (such as phenyl group); an aralkyl group having 7–10 carbon atoms etc. Examples of the amino group disubstituted with hydrocarbon groups having 1–10 carbon atoms include a dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., and preferably a dimethylamino group or diethylamino group.

These disubstituted amino groups may be substituted partly with a halogen atom such as a fluorine atom, chlorine atom, bromine atom, iodine atom and the like; an alkoxy group such as methoxy group, ethoxy group and the like; an aryloxy group (such as phonoxy group) and the like; or an aralkyloxy group (such as benzyloxy group) and the like.

The substituents $R^1$, $R^2$, $R^3$, $R^4$, $R^5$ and $R^6$ may be optionally combined to form a ring.

$R^1$ is preferably an alkyl group, an aralkyl group, an aryl group, or a substituted silyl group.

$X^1$ and $X^2$ independently and preferably represent a halogen atom, an alkyl group, an aralkyl group, an alkoxy group, an aryloxy group, or a disubstituted amino group, more preferably a halogen atom or an alkoxy group.

Examples of the atom of group XVI in the Periodic Table include an oxygen atom, sulfur atom, selenium atom, and preferably oxygen atom.

Examples of the transition metal complex represented by the general formula [I] include: methylene(cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy)titanium dichloride, methylene(methylcyclopentadienyl)(3-tert-butyl-5-methyl-2-phenoxy)titanium dichloride, methylene(methylcyclopentadienyl)(3-phenyl-2-phenoxy)titanium dichloride, methylene(methylcyclopentadienyl)(3-tert-butyldimethylasiyl-5-methyl-2-phenoxy)titanium dicchoride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy) titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl- 2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsily1-5-methyl-2-phenoxy)titanium dichloride, methylene(tetramethylcyclopentadienyl)(3-tert-butyl-5-methoxy–2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy–2- phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy–2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, 2-phenoxy)titanium dichloride, isopropylidene(cyclopentadienyl)(3-tert-butyl-5-chloro-2-phenoxy)titanium dichloride, isopropylidene{methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy–2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl- 2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy–2-phenoxy)titanium dichloride, isopropylidenettert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy–2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy–2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)( 3-tert-butyl-5-methoxy–2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene (cyclopentadienyl)(3-tert-butyldimethylsilyl-5-methyl-2-phenoxy)titanium dichloride, diphenylmethylene (cyclopentadienyl)(3-trimethylsilyl-5-methyl-2-phenoxy)titanium dichloride, diphenylmethylene (cyclopentadienyl)(3-tert-butyl-5-methoxy- 2-phenoxy)titanium dichloride, diphenylmethylene (cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene (methylcyclopentadienyl)(3-phenyl-2-phenoxy)titanium dichloride, diphenylmethylene (methylcyclopentadienyl) (3-tert-butyldimethylsilyl-5-methyl-2-phenoxy)titanium dichloride, diphenylmethylene (methylcyclopentadienyl) (3-trimethylsilyl-5-methyl-2-phenoxy)titanium dichloride, diphenylmethylene (methylcyclopentadienyl)(3-tert-butyl-5-methoxy-2-phenoxy)titanium dichloride, diphenylmethylene (methylcyclopentadienyl)(3-tert-butyl-5-chloro-2-phenoxy)titanium dichloride, diphenylmethylene (tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-pheny-2- phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsily-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titaniumdichloride, etc., transition metal complexes wherein J in the chemical formula [I] is a carbon atom, such as compounds wherein titanium of these compounds is replaced by zirconium or hafnium, compounds wherein the dichloride of these compounds is replaced by dibromide, diiodide, bis (dimethylamide), bis (diethylamide), di-n-butoxide or diisopropoxide, compounds wherein cyclopentadienyl of these compounds is replaced by dimethylcyclopentadienyl, trimethylcyclopentadienyl, n-butylcyclopentadienyl, tert-butyldimethylsilylcyclopentadienyl or indenyl, and compounds wherein 3,5-dimethyl-2-phenoxy of these compounds is replaced by 2-phenoxy, 3-methyl-2-phenoxy, 3,5-di-tert-butyl-2-phenoxy, 3-phenyl-5-methyl-2-phenoxy, 3-tert-butyldimethylsilyl-2-phenoxy or 3-trimethylsilyl-2-phenoxy; and dimethylsilyl(cyclopentadienyl)(2-phenoxy)titanium dichloride, dimethylsilyl(cyclopentadienyl)(3-methyl-2-phenoxy)titanium dichloride, dimethylsilyl(cyclopentadienyl)(3,5-dimethyl-2-phenoxy)titanium dichloride, dimethylsilyl(cyclopentadienyl)(3-tert-butyl-2-phenoxy)titanium dichloride, dimethylsilyl(cyclopentadienyl)(3-tert-butyl-5-methyl-2-phenoxy)titanium dichloride, dimethylsilyl(cyclopentadienyl)(3,5-di-tert-butyl-2-phenoxy)titanium dichloride, dimethylsilyl(cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl(cyclopentadienyl)(3-tert-butyl-5-methoxy-2-phenoxy)titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy)titanium dichloride, dimethylsilyl(methylcyclopentadienyl)(2-phenoxy)titanium dichloride, dimethylsilyl(methylcyclopentadienyl)(3-methyl-2-phenoxy)titanium dichloride, dimethylsilyl(methylcyclopentadienyl)(3,5-dimethyl-2-phenoxy)titanium dichloride, dimethylsilyl(methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl(methylcyclopentadienyl)(5-methyl-3-phenyl-2-phenoxy)titanium dichloride, dimethylsilyl(methylcyclopentadienyl)(3-tert-butyldimethylsilyl-5-methyl-2-phenoxy)titanium dichloride, dimethylsilyl(methylcyclopentadienyl)(5-methyl-3-trimethylsilyl-2-phenoxy)titanium dichloride, dimethylsilyl(methylcyclopentadienyl)(3-tert-butyl-5-methoxy-2-phenoxy)titanium dichloride, dimethylsilyl(methylcyclopentadienyl)(3-tert-butyl-5-chloro-2-phenoxy)titanium dichloride, dimethylsilyl(methylcyclopentadienyl)(3,5-diamyl-2-phenoxy)titanium dichloride, dimethylsilyl(n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy)titanium dichloride, dimethylsilyl(n-butylcyclopentadienyl)(3-tert-butyl-5-methyl-2-phenoxy)titanium dichloride, dimethylsilyl(n-butylcyclopentadienyl)(3,5-di-tert-butyl-2-phenoxy)titanium dichloride, dimethylsilyl(n-butylcyclopentadienyl)(5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy)titanium dichloride, dimethylsilyl(n-butylcyclopentadienyl)(3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)( 3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl-2-phenoxy)titanium dichloride, dimethylsilyl(tert-butylcyclopentadienyl)(3,5-di-tert-butyl-2-phenoxy)

titanium dichloride, dimethylsilyl(tert-butylcyclopentadienyl)(5-methyl-3-phenyl-2-phenoxy) titanium dichloride, dimethylsilyl(tert-butylcyclopentadienyl)(3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy) titanium dichloride, dimethylsilyl(tert-butylcyclopentadienyl)(3-tert-butyl-5-chloro-2-phenoxy) titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dimethylsilyl(tetramethylcyclopentadienyl)(3-methyl-2-phenoxy) titanium dichloride, dimethylsilyl(tetramethylcyclopentadienyl)(3,5-dimethyl-2-phenoxy) titanium dichloride, dimethylsilyl(tetramethylcyclopentadienyl)(3-tert-butyl-2-phenoxy) titanium dichloride, dimethylsilyl(tetramethylcyclopentadienyl)(3-tert-butyl-5-methyl-2-phenoxy)titanium dichloride, dimethylsilyl(tetramethylcyclopentadienyl)(3,5-di-tert-butyl-2-phenoxy) titanium dichloride, dimethylsilyl(tetramethylcyclopentadienyl)(5-methyl-3-phenyl-2-phenoxy)titanium dichloride, dimethylsilyl(tetramethylcyclopentadienyl)(3-tert-butyldimethylsilyl-5-methyl-2-phenoxy)titanium dichloride, dimethylsilyl(tetramethylcyclopentadienyl)(5-methyl-3-trimethylsilyl-2-phenoxy)titanium dichloride, dimethylsilyl(tetramethylcyclopentadienyl)(3-tert-butyl-5-methoxy-2-phenoxy)titanium dichloride, dimethylsilyl(tetramethylcyclopentadienyl)(3-tert-butyl-5-chloro-2-phenoxy)titanium dichloride, dimethylsilyl(tetramethylcyclopentadienyl)(3,5-diamyl-2-phenoxy) titanium dichloride, dimethylsilyl(trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl(trimethylsilylcyclopentadienyl)(3,5-dimethyl-2-phenoxy) titanium dichloride, dimethylsilyl(trimethylsilylcyclopentadienyl)(3-tert-butyl-2-phenoxy) titanium dichloride, dimethylsilyl(trimethylsilylcyclopentadienyl)(3-tert-butyl-5-methyl-2-phenoxy)titanium dichloride, dimethylsilyl(trimethylsilylcyclopentadienyl)(3,5-di-tert-butyl-2-phenoxy)titanium dichloride, dimethylsilyl(trimethylcyclopentadienyl)(5-methyl-3-phenyl-2-phenoxy) titanium dichloride, dimethylsilyl(trimethylsilylcyclopentadienyl)(3-tert-butyldimethylsilyl-5-methyl-2-phenoxy)titanium dichloride, dimethylsilyl(trimethylsilylcyclopentadienyl)(5-methyl-3-trimethylsilyl-2-phenoxy)titanium dichloride, dimethylsilyl(trimethylsilylcyclopentadienyl)(3-tert-butyl-5-methoxy-2-phenoxy)titanium dichloride, dimethylsilyl(trimethylsilylcyclopentadienyl)(3-tert-butyl-5-chloro-2-phenoxy)titanium dichloride, dimethylsilyl(trimethylsilylcyclopentadienyl)(3,5-diamyl-2-phenoxy) titanium dichloride, dimethylsilyl(indenyl)(2-phenoxy) titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl(indenyl)(3-tert-butyl-2-phenoxy)titanium dichloride, dimethylsilyl(indenyl)(3-tert-butyl-5-methyl-2-phenoxy) titanium dichloride, dimethylsilyl(indenyl)(3,5-di-tert-butyl- 2-phenoxy)titanium dichloride, dimethylsilyl(indenyl)(5-methyl-3-phenyl-2-phenoxy)titanium dichloride, dimethylsilyl(indenyl)(3-tert-butyldimethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy)titanium dichloride, dimethylsilyl(indenyl)(3-tert-butyl-5-chloro-2-phenoxy)titanium dichloride, dimethylsilyl(indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy) titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl(fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)(3-tert-butyldimethylsilyl-5-methyl-2-phenoxy)titanium dichloride, dimethylsilyl(fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy) titanium dichloride, dimethylsilyl(tetramethyl cyclopentadienyl)(1-naphthoxy-2-il)titanium dichloride, etc., the compounds wherein the (cyclopentadienyl) of these compounds have been changed to (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilyl cyclopentadienyl), (phenylcyclopentadienyl), (methylindenyl), or (phenylindenyl); the compounds wherein (2-phenoxy) has been changed to (3-phenyl 2-phenoxy), (3-trimethyl silyl-2-phenoxy), or (3-tert-butyl dimethylsilyl-2-phenoxy); the compounds wherein dimethyl silyl has been changed to diethyl silyl, diphenyl silyl, or dimethoxy silyl; the compounds wherein titanium has been changed to zirconium or hafnium; the compounds wherein dichloride has been changed to dibromide, diiodide, bis (dimethylamide), bis(diethylamide), di-n-buthoxide, or diisopropoxide, which are transition metal complexes wherein J in the chemical formula [I] is an atom of the group XIV in the Periodic Table of the elements other than the carbon atoms.

Examples of the transition metal complex represented by the general formula [II] include:

μ-oxo bis{isopropylidene($\eta^5$-cyclopentadienyl)(2-phenoxy)titanium chloride}, μ-oxo bis{isopropylidene($\eta^5$-cyclopentadienyl)(2-phenoxy)titanium methoxide}, μ-oxo bis{isopropylidene($\eta^5$-cyclopentadienyl)(3-tert-butyl-5-methyl-2-phenoxy)titanium chloride}, μ-oxo bis{isopropylidene($\eta^5$-cyclopentadienyl)(3-tert-butyl-5-methyl-2-phenoxy)titanium methoxide}, μ-oxo bis{isopropylidene($\eta^5$-methylcyclopentadienyl)(2-phenoxy)titanium chloride}, μ-oxo bis{isopropylidene($\eta^5$-ethylcyclopentadienyl)(2-phenoxy)titanium methoxide}, μ-oxo bis{isopropylidene($\eta^5$-methylcyclopentadienyl)(3-tert-butyl-5-methyl-2-phenoxy)titanium chloride}, μ-oxo bis{isopropylidene($\eta^5$-methylcyclopentadienyl)(3-tert-butyl-5-methyl-2-phenoxy)titanium methoxide}, μ-oxo bis{isopropylidene.($\eta^5$-tetramethylcyclopentadienyl)(2-phenoxy)titanium chloride}, μ-oxo bis{isopropylidene(η⁵-tetramethylcyclopentadienyl)(2-phenoxy)titanium methoxide}, μ-oxo bis{isopropylidene(η⁵-tetramethylcyclopentadienyl)(3-tert-butyl-5-methyl-2-phenoxy)titanium chloride}, μ-oxo bis{isopropylidene(η⁵-tetramethylcyclopentadienyl)(3-tert-butyl-5-methyl-2-phenoxy)titanium methoxide}, μ-oxo bis{dimethylsilylene(η⁵-cyclopentadienyl)(2-phenoxy)titanium chloride}, μ-oxo bis{dimethylsilylene(η⁵-cyclopentadienyl)(2-phenoxy)titanium methoxide}, μ-oxo bis{dimethylsilylene(η⁵-cyclopentadienyl)(3-tert-butyl-5-methyl-2-phenoxy)titanium chloride}, μ-oxo bis{dimethylsilylene(η⁵-cyclopentadienyl)(3-tert-butyl-5-methyl-2-phenoxy)titanium methoxide}, μ-oxo bis{dimethylsilylene(η⁵methylcyclopentadienyl)(2-phenoxy)titanium chloride}, μ-oxo bis{dimethylsilylene(η⁵methylcyclopentadienyl)(2-phenoxy)titanium methoxide}, μ-oxo bis(dimethylsilylene(η⁵methylcyclopentadienyl)(3-tert-butyl-5-methyl-2-phenoxy)titanium chloride}, μ-oxo bis{dimethylsilylene(η⁵methylcyclopentadienyl)(3-tert-butyl-5-methyl-2-phenoxy)titanium methoxide}, μ-oxo bis{dimethylsilylene(η⁵tetramethylcyclopentadienyl)(2-phenoxy)titanium chloride}, μ-oxo bis{dimethylsilylene(η⁵tetramethylcyclopentadienyl)(2-phenoxy)titanium methoxide}, μ-oxo bis{dimethylsilylene(η⁵tetramethylcyclopentadienyl)(3-tert-butyl-5-methyl-2-phenoxy)titanium chloride} and μu-oxo bis{dimethylsilylene(η⁵tetramethylcyclopentadienyl)(3-tert-butyl-5-methyl-2-phenoxy)titanium methoxide}.

Examples of the transition metal complex represented by the general formula [III] include:

di-μ-oxo bis{isopropylidene(η⁵-cyclopentadienyl)(2-phenoxy)titanium}, di-μ-oxo bis{isopropylidene(η⁵-cyclopentadienyl)(3-tert-butyl-5-methyl-2-phenoxy)titanium}, di-μ-oxo bis{isopropylidene(η⁵-methylcyclopentadienyl)(2-phenoxy)titanium}, di-μ-oxo bis{isopropylidene(η⁵-methylcyclopentadienyl)(3-tert-butyl-5-methyl-2-phenoxy)titanium}, di-μ-oxo bis{isopropylidene(η⁵-tetramethylcyclopentadienyl)(2-phenoxy)titanium}, di-μ-oxo bis{isopropylidene(η⁵-tetramethylcyclopentadienyl)(3-tert-butyl-5-methyl-2-phenoxy)titanium}, di-μ-oxo bis{dimethylsilylene(η⁵-cyclopentadienyl)(2-phenoxy)titanium}, di-μ-oxo bis{dimethylsilylene(η⁵-cyclopentadenyl)(3-tert-butyl-5-methyl-2-phenoxy)titanium}, di-μ-oxo bis{dimethylsilylene(η⁵-methylcyclopentadienyl)(2-phenoxy)titanium}, di-μ-oxo bis{dimethylsilylene(η⁵-methylcyclopentadienyl)(3-tert-butyl-5-methyl-2-phenoxy)titanium}, di-μ-oxo bis {dimethylsilylene(η⁵-tetramethylcyclopentadienyl)(2-phenoxy)titanium} and di-μ-oxo bis{dimnethylsilylene(η⁵-tetramethylcyclopentadienyl)(3-tert-butyl-5-methyl-2-phenoxy)titanium}.

Among the listed transition metal complexes represented by the general formula [II], [II] or [III], preferable are isopropylidene(cyclopentadienyl)(3-tert-butyl-5-methyl-2-phenoxy)titanium dichloride, diethylsilylene(tetramethylcyclopentadienyl)(3-tert-butyl-5-methyl-2-phenoxy)titanium dichloride, μ-oxobis{isopropylidne(η⁵-cyclopentadienyl)(3-tert-butyl-5-methyl-2-phenoxy) titanium chloride}, μoxobis{isopropylidne(η⁵-cyclopentadienyl)(3-tert-butyl-5-methyl-2-phenoxy) titanium methoxide}, μoxobis{dimethylsilylene(η⁵-tetramethylcyclopentadienyl)(3-tert-butyl-5-methyl-2-phenoxy)titanium dichloride}, μoxobis{dimethylsilylene(η⁵-tetramethylcyclopentadienyl)(3-tert-butyl-5-methyl-2-phenoxy)titanium methoxide}, di-μ-oxobis{isopropylidene(η⁵-cyclopentadienyl)(3-tert-butyl-5-methyl-2-phenoxy)titanium} and di-μ-oxobis{dimethylsilylene(η⁵-tetramethylcyclopentadienyl)(3-tert-butyl-5-methyl-2-phenoxy)titanium}.

Particularly, an ethylene-based polymer satisfying formulae (2) and (3) of the present invention and an ethylene-based polymer satisfying formulae (4) and (5) of the present invention obtained by using a diolefin as a polymerization component are preferably produced in the presence of a catalyst comprising a transition metal complex such as dimethylsilylene(tetramethylcyclopentadienyl)(3-tert-butyl-5-methyl-2-phenoxy)titanium dichloride, dimethylsilylene(tetrametylcyclopentadienyl)(3-tert-butyl-5-methyl-2-phenoxy)titanium dimethoxide, μ-oxobis{dimethylsilylene(η⁵-tetramethylcyclopentadienyl) (3-tert-butyl-5-methyl-2-phenoxy)titanium chloride}, μ-oxobis}dimethylsilylene(μ⁵-tetramethylcyclopentadienyl)(3-tert-butyl-5-methyl-2-phenoxy)titanium methoxide} and di-μ-oxobis{dimethylsilylene(η⁵-tetramethylcyclopentadienyl)(3-tert-butyl-5-methyl-2-phenoxy)titanium}. On the other hand, an ethylene-based polymer satisfying formulae (4) and (5) of the present invention obtained by using no diolefin as a polymerization component is preferably produced in the presence of a catalyst comprising a transition metal complex such as isopropylidene(cyclopentadienyl)(3-tert-butyl-5-methyl-2-phenoxy)titanium dichloride, isopropylidene(cyclopentadienyl)(3-tert-butyl-5-methyl-2-phenoxy)titanium dimethoxide, μ-oxobis{isopropylidene(η⁵-cyclopentadienyl)(3-tert-butyl-5-methyl- 2-phenoxy)titanium chloride}, μ-oxobis{isopropylidene(η⁵-cyclopentadienyl)(3-tert-butyl-5-methyl-2-phenoxy)titanium methoxide}and di-μ-oxobis{isopropylidene(η⁵-cyclopentadienyl)(3-tert-butyl-5-methly-2-phenoxy)titnaium}.

The transit-on metal complex represented by the general formula [I] can be synthes- zed according to the method described in WO 97/13992, which is incorporated herein by reference in its entirely. The transition metal complex represented by the general formula [II] or [III] can be prepared by reacting the transition metal complex represented by the general formula [I] with 0.5 or 1 equivalent amounts of water. In this case, a method that the transition metal complex represented by the general formula [I] reacted directly with the required water, a method that the transition metal complex represented by the general formula [I] is poured into the dried solvent such as hydrocarbons and inert gas containing the required water is massed through the solvent, and the like are adopted.

The catalyst used in the present invention is preferably a catalyst comprising said transition metal compound, and compound (B) and/or compound (C).

Aluminum compounds (B) are one or more of aluminum compounds selected from the following (B1)–(B3)
(B1) organoaluminum compound represented by the general formula $E^1{}_a AlZ_{3-a}$,
(B2) cyclic aluminoxane having a structure represented by the general formula $\{-Al(E^2)-O-\}_b$, and
(B3) linear aluminoxane having a structure represented by the general formula $E^3\{-Al(E^3)-O-\}_c AlE^3{}_2$
(wherein $E^1$, $E^2$ and $E^3$ respectively represent a hydrocarbon group and all of $E^1$, $E^2$ and $E^3$ may be the same or different; Z represents a hydrogen atom or a halogen atom and all of z may be the same or different; a satisfies the following equation: $0 < a \leq 3$; b represents an integer of 2 or more; and c represents an integer of 1 or more).

As the hydrocarbon group in $E^1$, $E^2$ and $E^3$ the hydrocarbon group having carbon atoms of 1–8 is preferable, and alkyl group is more preferable.

Specific examples of the organoaluminum compound (B1) represented by the general formula $E^1{}_a AlZ_{3-a}$ include trialkylaluminum such as trimethylaluminum, triethylaluminum, tripropylaluminum, triisobutylaluminum, trihexylaluminum, etc.; dialkylaluminum chloride such as dimethylaluminum chloride, diethylaluminum chloride, dipropylaluminum chloride, diisobutylaluminum chloride, dihexylaluminum chloride, etc.; alkylaluminum dichloride such as methylaluminum dichloride, ethylaluminum dichloride, propylaluminum dichloride, isobutylaluminum dichloride, hexylaluminum dichloride, etc.; and dialkylaluminum hydride such as dimethylaluminum hydride, diethylaluminum hydride, dipropylaluminum hydride, diisobutylaluminum hydride, dihexylaluminum hydride, etc.

Among them, trialkylaluminum is preferable, and triethylaluminum and triisobutylaluminum are more preferable.

Specific examples of $E^2$ and $E^3$ in the cyclic aluminoxane (B2) having a structure represented by the general formula $\{-Al(E^2)-O-\}_b$ and linear aluminoxane (B3) having a structure represented by the general formula $E^3\{-Al(E^3)-O-\}_c AlE^3{}_2$ include alkyl groups such as methyl group, ethyl group, normal propyl group, isopropyl group, normal butyl group, isobutyl group, normal pentyl group, neopentyl group and the like. b is an integer of not less than 2, and c is an integer of not less than 1. $E^2$ and $E^3$ are preferably methyl groups or isobutyl groups, b is preferably 2 to 40 and c is preferably 1 to 40.

The above aluminoxane is produced by various methods. The method is not specifically limited, and the aluminoxane may be produced according to known methods. For example, it is produced by bringing a solution prepared by dissolving a trialkylaluminum (e.g. trimethylaluminum, etc.) in a suitable solvent (e.g. benzene, aliphatic hydrocarbon, etc.), into contact with water. There can also be used a method of bringing a trialkylaluminum (e.g. trimethylaluminum, etc.) into contact with a metal salt containing crystallization water (e.g. copper sulfate hydrate, etc.).

Boron compound (C) is explained as follows:

As the boron compound (C), any one of boron compound (C1) represented by the general formula $BQ^1Q^2Q^3$, boron compound(C2) represented by the general formula $G^+ (BQ^1Q^2Q^3Q^4)^-$ and boron compound(C3) represented by the general formula $(L-H)^+ (BQ^1Q^2Q_3Q^4)^-$ can be used.

In the boron compound (C1) represented by the general formula $BQ^1Q^2Q^3$, B represents a trivalent boron atom in the valence state; and $Q^1$ to $Q^3$ may be the same or different and represent a halogen atom, a hydrocarbon group, a halogenated hydrocarbon group, a substituted silyl group, a alkoxy group or a disubstituted amino group. $Q^1$ to $Q^3$ represent preferably a halogen atom, a hydrocarbon group having carbon atoms of 1–20, a halogenated hydrocarbon group having carbon atoms of 1–20, a substituted silyl group having carbon atoms of 1–20, a alkoxy group having carbon atoms of 1–20 or a disubstituted amino group having carbon atoms of 2–20. $Q^1$ to $Q^3$ represent more preferably a halogen atom, a hydrocarbon group having carbon atoms of 1–20 or a halogenated hydrocarbon group having carbon atoms of 1–20. $Q^1$ to $Q_R$ represent further more preferably a fluorinated hydrocarbon group having carbon atoms of 1–20 and having at least one fluorine atom. $Q^1$ to $Q_R$ represent especially preferably a fluorinated aryl group having carbon atoms of 6–20 and having at least one fluorine atom.

Specific examples of the compound (C1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc. Among them, tris (pentafluorophenyl)borane is most preferable.

In the boron compound (C2) represented by the general formula $G^+ (BQ^1Q^2Q^3Q^4)-$, $G_+$ represents an inorganic or organic cation; B represents a trivalent boron in the valence state; and $Q^1$ to $Q^4$ are the same as $Q^1$ to $Q^3$ in the above (C1).

In the compound represented by the general formula $G^+ (BQ^1Q^2Q^3Q^4)-$, specific examples of $G_+$ as an inorganic cation include ferrocenium cation, alkyl-substituted ferrocenium cation, silver cation, etc. and specific examples of $G^+$ as an organic cation include triphenylmethyl cation, etc. $G^+$ preferably carbenium cation, more preferably triphenylmethyl cation. Examples of $(BQ^1Q^2Q^3Q^4)$ include tetrakis (pentafluorophenyl)borate, tetrakis(2,3,5,6-tetrafluorophenyl)borate, tetrakis(2,3,4,5-tetrafluorophenyl) borate, tetrakis(3,4,5-trifluorophenyl)borate, tetrakis(2,3,4-trifluorophenyl)borate, phenyltris (pentafluorophenyl) borate, tetrakis(3,5-bistrifluorophenylmethyl)borate and the like.

Examples of the specific combination of them include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis (3,5-bistrifluorophenyl)borate and the like. Among them, triphenylmethyl tetrakis(pentafluorophenyl)borate is most preferable.

In the compound (C3) represented by the general formula $(L-H)^+ (BQ^1Q^2Q^3Q^4)^-$, L represents a neutral Lewis base; $(L-H)^+$ represents a Brønsted acid; B represents a trivalent boron in the valence state; and $Q^1$ to $Q^4$ are the same as $Q^1$ to $Q^3$ in the above (C1).

In the compound represented by the general formula $(L-H)^+(BQ^1Q^2Q^3Q^4)-$, specific examples of $(L-H)^+$ as Brønsted acid include trialkyl-substituted ammonium, N,N-dialkylanilinium, dialkylammonium, triarylphosphonium, etc. and specific examples of $(BQ^1Q^2Q^3Q^4)^-$ include the same one as that described above.

Examples of the specific combination of them include triethylammonium tetrakis(pentafluorophenyl)borate, tripropylammonium tetrakis(pentafluorophenyl)borate, tri (n-butyl)ammonium tetrakis(pentafluorophenyl)borate, tri (n-butyl)ammonium tetrakis(3,5-bistrifluoromethylphenyl) borate, N,N-dimethylanilium tetrakis(pentafluorophenyl) borate, N,N-diethylanilium tetrakis(pentafluorophenyl) borate, N,N-2,4,6-pentamethylanilium tetrakis (pentafluorophenyl)borate, N,N-dimethylanilium. tetrakis(3, 5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, tri(dimethylphenyl)phosphonium tetrakis(pentafluorophenyl)borate, etc. Among them, tri(n-butyl)ammonium tetrakis(pentafluorophenyl) borate or N,N-dimethylanilinium tetrakis(pentafluorophenyl)borate is most preferable.

Each catalyst component is used so that a molar ratio of (B) to (A) is preferably from 0.1 to 10000, more preferably from 5 to 2000, and a molar ratio of (C) to (A) is preferably from 0.01 to 100, more preferably from 0.5 to 20.

With regard to the concentration of each catalyst component used in the state of a solution or in a state of suspension in the solvent, optional selection is made depending on the capacity of the apparatus for supplying each component to the polymerization reactor and the like. Each component is used so that an amount of (A) is preferably from 0.01 to 500 mmol/kg, more preferably from 0.05 to 100 mmol/kg, further preferably from 0.05 to 50 mmol/kg, an amount of (B) is preferably from 0.01 to 10000 mmol/kg, more preferably from 0.1 to 5000 mmol/kg, further preferably from 0.1 to 2000 mmol/kg, in terms of Al atom, and an amount of (C) is preferably from 0.01 to 500 mmol/kg, more preferably from 0.05 to 200 mmol/kg, further preferably from 0.05 to 100 mmol/kg.

The catalyst used in the present invention may be combined with a transition metal complex, compound (B), (C) and/or a granular carrier containing an inorganic carrier such as $SiO_2$, $Al_2O_3$ and the like, and an organic polymer carrier like an olefin polymer and the like such as ethylene, styrene and the like.

A method for polymerizing an ethylene-based polymer of the present invention is not particularly restricted, and examples thereof include a liquid phase polymerization method, high pressure ion polymerization method and gas phase polymerization method. Polymerization mode can be any of batch-wise mode and continuous mode, and continuous mode is preferable. As the reaction vessel, a stirring bath type reaction vessel or a tube type reaction vessel can be usually used. Polymerization can be conducted in a single reaction region. However, one reaction vessel can be partitioned into a plurality of reaction regions or a plurality of reaction vessels can be connected in series or in parallel for the polymerization. When a plurality of reaction vessels are used, any of bath-bath combination and bath-tube combination may be permissible. In a method for polymerization in a plurality of reaction regions or in a plurality of reaction vessels, polymers having different properties can also be produced by changing temperature, pressure and gas composition in each reaction region. Further, in the present invention, a chain transfer reagent such as hydrogen and the like can also be added for regulating the molecular weight of a copolymer.

When polymerization is conducted in a liquid phase polymerization method, as the solvent used, saturated hydrocarbon-base solvents such as butane, hexane, heptane and the like; aromatic hydrocarbon-based solvents such as toluene, xylene and the like are for example listed, and the polymerization temperature is usually in the range from 10 to 120° C., and the ethylene pressure is usually in the range from 0.1 to 5 MPa When polymerization is conducted by a high pressure ion polymerization method, the polymerization pressure is usually in the range from 25 to 500 MPa, and the polymerization temperature is in the range from 130 to 350° C., and the polymerization is preferably conducted in the absence of a solvent from the standpoint of molecular weight.

When polymerization is conducted by a gas phase polymerization method, the polymerization temperature is usually in the range from 50 to 100° C., and the ethylene pressure is usually in the range from 1 to 5 MPa.

Further, the ethylene-based polymer of the present invention is suitable for a film, sheet or molded article since it has excellent properties as described above. Particularly, molded films obtained by inflation film molding processing in which a melted ethylene-based copolymer of the present invention is extruded through a round die and the film swollen in the form of a tube is wound, or by T die film molding processing in which a melted ethylene-based copolymer of the present invention is extruded through a straight die and the film is wound, and molded sheets obtained by calender molding processing are extremely suitable as wrapping materials, sheet materials and the like since they are excellent in transparency and mechanical nature.

Further, a multi-layer film and sheet with other materials containing two or more layers can also be produced. These can be produced by known various laminating methods such as a co-extrusion method, dry lamination method, sandwich lamination method, extrusion lamination method and the like. Herein, as the other material, known materials such as paper, cardboard, aluminum thin film, cellophane, nylon, (PET), (PP), polyvinylidene chloride, (EVOH), various adhesive resins and the like are listed. A molded article obtained by blow molding processing and injection molding processing is also extremely suitable as a vessel material and the like excellent in transparency and mechanical nature.

In a film, sheet or molded article of the present invention, known additives such as antioxidants, weathering agents, lubricants, anti-blocking agents, antistatic agents, anti-fogging agents, non-dripping agents, pigments, fillers and the like may be added. Further, known polymer substances such as radical polymerization method low density polyethylene, high density polyethylene, linear low density polyethylene, ethylene-α-olefin copolymerization elastomer, polypropylene and the like may also be compounded.

A film or sheet of the present invention may be subjected to known post-treatment such as corona discharge treatment, plasma treatment, ozone treatment, ultraviolet ray irradiation, electron beam irradiation and the like.

Effect of the Invention

As described above, according to the present invention, an ethylene-based polymer excellent in transparency, mechanical nature and viscoelasticity, an ethylene-based polymer having excellent mechanical property, and an ethylene-based polymer having excellent processing property and mechanical strength property can be provided.

Also, according to the present invention, a method for producing the above-described ethylene-based polymer efficiently can be provided.

Further, according to the present invention, there can be provided a film, sheet or molded article comprising the above-described excellent ethylene-based polymer.

Example

The present invention will be illustrated based on the following examples, but the present invention is by no means restricted to these examples.

Analysis and evaluation method and the like were carried out as follows.

(1) Molar Content "m" (mol %) of Addition Polymerizable Monomer

When an addition polymerizable monomer is vinylcyclohexane, the molar content "m" was calculated using a calibration formula described below from peak strength at 1.6 to 1.8 ppm attributed to five hydrogen atoms bonded to methine carbons of a cyclohexyl group and methylene carbons on both sides by 1H-NMR or an absorption peak in FT-IR measurement of a press sheet having a thickness of about 0.1 mm.

$$m=0.24 \times \log(I_0/I) \times 0.01/d$$

(wherein, I represents peak permeability, $I_0$ represents base line permeability, and d represents press sheet thickness (m))

The molar content of 1-hexene was calculated using the following formula from absorption peaks at 1369 and 1303 cm$^{-1}$ in FT-IR measurement of a sheet having a thickness of about 0.1 mm.

$$m=200 \times b/(100-4 \times b)$$

$$b=0.757 \times (K'_{1369}-0.95 \times K'_{1303}+3.8)$$

$$K'=0.925 \times \log((I_0/I) \times 0.01/d$$

The content of 4-methyl-1-pentene was calculated using the following formula from absorption peaks at 1383 and 1303 cm$^{-1}$ in FT-IR measurement of a press sheet having a thickness of about 0.1 mm.

$$m=200 \times b/(100-4 \times b)$$

$$b=0.415 \times (K'_{1383}-0.95 \times K'_{1303}+3.8)$$

$$K'=0.925 \times \log((I_0/I) \times 0.01/d$$

(2) Tensile Impact Strength (TI)

TI was measured based on ASTM D1822-68, and among n=5 measured values, the top and bottom values were omitted and the remaining three intermediate values were averaged.

Since tensile impact strength (TI) varies depending on molecular weights represented by melt index. (MI), and crystallnities represented by swelling ratio (SR), fusion heat quantity (H) and melting temperature (Tm), superiority and inferiority can be evaluated as follows.

When an ethylene-based copolymer has a (MI) in the range from 0.5 to 25 g/10 minutes, a swelling ratio (SR) of less than 1.2 and a fusion heat quantity (H) in the range from 90 to 165 kJ/kg, the tensile impact strength TI (kJ/m$^2$) satisfies the following formula (16). Therefore, when the following formula (16) is satisfied, excellence in the tensile impact strength is shown.

The fusion heat quantity (H)(kJ/kg) herein referred to means an absorption heat quantity in temperature rising in measurement of the melting temperature (Tm), and more specifically, an area surrounded by the fusion curve and a base line drawn from a point at 42° C. to a point at the complete fusion temperature on the fusion curve $$TI > -30 \times H - 950 \times \log(MI) + 6000 \quad (16)$$

When an ethylene-based copolymer has a (MI) in the range from 0.5 to 25 g/10 minutes, a swelling ratio (SR) of not less than 1.2 and a fusion heat quantity (H) observed in measuring the melting temperature (Tm) in the range from 90 to 165 kJ/kg, the tensile impact strength TI (kJ/m$^2$) satisfies the following formula (17).

Therefore, when the following formula (17) is satisfied, excellence in the tensile impact strength is shown. Further, in the case of this ethylene-based copolymer, a swelling ratio (SR) of not less than 1.2 shows that the ethylene-based copolymer is also excellent in molding processability.

$$TI > -79 \times Tm - 1250 \times \log(MI) + 10600 \quad (17)$$

(3) Haze

The whole haze was measured according to ASTM-D1003 of a sheet having a thickness of 0.3 mm obtained by pre-heating for 5 minutes in a heat press machine at 150° C., then, pressing for 5 minutes and cooling in a cooling press at 35° C.

Since haze varies depending on molecular weights represented by melt index (MI), and crystallnities represented by fusion heat quantity (H) and melting temperature (Tm), superiority and inferiority can be evaluated by comparison between samples having equivalent (MI) and (H).

(4) Glass Transition Temperature (Tg)

To obtain the glass transition temperature (Tg) of an ethylene-based copolymer, peak temperature was measured in a temperature-dependent curve of loss elastic modulus obtained under the following conditions.

Higher Tg for the same Tm or the same molar content of a vinyl compound A means presence of specific viscoelastic property.

Apparatus: DMS200, manufactured by Seiko Instruments Co .

Sample size: thickness 0.3 mm×width 3.0 mm

Chuk interval: 20 mm

Frequency: 5 Hz

Amplitude: 10 μm

Temperature rising speed: 2° C./min. from −150° C. to 150° C.

EXAMPLE 1

An autoclave equipped with a stirrer having an internal volume of 5 liter was evacuated, then, 108 mL of hydrogen, 2 liter of hexane as a solvent and 52 mL of vinylcyclohexane as an addition polymerizable monomer were charged, and the reaction vessel was heated to 80° C. Subsequently, ethylene was fed while controlling the feeding rate at 1.2 MPa, and after stabilization inside the system, 1.5 mmol of triisobutylaluminum, 1.5 μmol of dimethylsilylene (tetramethylcyclopentadienyl)(3-tert-butyl-5-methyl-2-phenoxy)titanium dichloride synthesized according to Ex.64 in JP-A No. 09-087313 and 4.5 μmol of dimethylaniliniumtetrakis(pentafluorophenyl) borate were added sequentially and polymerization was initiated. Five minutes later, the polymerization was terminated by adding 10 mL of ethanol. A white solid precipitated by adding the polymerization reaction solution into a large amount of ethanol was filtrated and dried in vacuo over night to obtain 61 g of an ethylene-vinylcyclohexane copolymer having a vinylcyclohexane content "m" of 2.6 mol %, a melting temperature Tm of 111.8° C., a MI of 2.6 g/10 minutes, a SR of 1.09, and a Mw/Mn of 1.8. The resulted ethylene-based copolymer had a sheet whole haze of 20% and a glass transition temperature of −9.6° C. The results are shown in Table 1.

EXAMPLE 2

Polymerization was conducted in the same manner as in Example 1 except that the charging amount of vinylcyclohexane was changed to 76 mL, the charging amount of hydrogen was changed to 0 mL and the polymerization time was changed to 6 minutes. As a result of the polymerization, 69 g of an ethylene-vinylcyclohexane copolymer was obtained having a vinylcyclohexane content "m" of 4.0 mol %, a Tm of 104.8° C., a MI of 5.3 g/10 minutes, a SR of 1.07, and a Mw/Mn of 1.8. The resulted ethylene-based copolymer had a glass transition temperature of −13.9° C. The results are shown in Table 1.

EXAMPLE 3

Polymerization was conducted in the same manner as in Example 1 except that 5.2 mL of vinylcyclohexane as an addition polymerizable monomer and 12.6 mL of 1-hexene were charged, the charging amount of hydrogen was changed to 0.0213 MPa and the polymerization time was changed to 7 minutes. As a result of the polymerization, 52 g of an ethylene-vinylcyclohexane-1-hexene ternary copolymer was obtained having a vinylcyclohexane content of 0.5 mol %, a 1-hexene content of 2.1 mol %, a Tm of 111.5° C., a MI of 1.45 g/10 minutes, a SR of 1.10, and a Mw/Mn of 1.8. The results are shown in Table 1.

COMPARATIVE EXAMPLE 1

Polymerization was conducted in the same manner as in Example 1 except that the charging amount of 1-hexene as an addition polymerizable monomer was changed to 17 mL, the charging amount of hydrogen was changed to 0.0347 MPa and the polymerization time was changed to 8 minutes. As a result of the polymerization, 87 g of an ethylene-1-hexene copolymer was obtained having a 1-hexene content of 2.5 mol %, a Tm of 111.8° C., a MI of 2.7 g/10 minutes, a SR of 1.07, and a Mw/Mn of 1.8. The resulted ethylene-based copolymer had a sheet whole haze of 30% and a glass transition temperature of −19.4° C. The results are shown in Table 2. Further, the melt viscosity $\eta^*_{190}$ was $1.95 \times 10^3$ Pa·s and the melt tension was 1.1 cN. The results are shown in Table 4.

COMPARATIVE EXAMPLE 2

Polymerization was conducted in the same manner as in Example 1 except that 14 mL of 4-methyl-1-pentene was charged as an addition polymerizable monomer instead of vinylcyclohexane, the charging amount of hydrogen was changed to 0.028 MPa and the polymerization time was changed to 10 minutes. As a result of the polymerization, 68 g of an ethylene-4-methyl-1-pentene copolymer was obtained having a 4-methyl-1-pentene content of 1.6 mol %, a Tm of 113.2° C., a MI of 2.1 g/10 minutes, a SR of 1.08, and a Mw/Mn of 1.7. The resulted ethylene-based copolymer had a tensile impact strength of 1890 kJ/m². The results are shown in Table 2.

COMPARATIVE EXAMPLE 3

Polymerization was conducted in the same manner as in Example 1 except that 49 mL of 3,3-dimethyl-1-butene (steric parameter Es of substituent R: −2.78) was charged as an addition polymerizable monomer instead of vinylcyclohexane, the charging amount of hydrogen was changed to 0.028 MPa and the polymerization time was changed to 23 minutes. The polymerization progressed and 4.6 g of a polymer was obtained, however, it became apparent that only an ethylene homopolymer was obtained since almost no absorption was recognized based on side methyl branching from FT-IR measurement.

COMPARATIVE EXAMPLE 4

An autoclave equipped with a stirrer having an internal volume of 0.4 liter was evacuated, then, 175 mL of toluene as a solvent, and 25 mL of vinylcyclohexane as an addition polymerizable monomer were charged, and the reaction vessel was heated to 50° C. Subsequently, ethylene was fed while controlling the feeding rate at 3 kg/cm², and after stabilization inside the system, 1.0 mmol of (PMAO) manufactured by Toso Aczo Corp. and 0.5 μmol of bis(tert-butylcyclopentadienyl)zirconium dichloride synthesized according to J. Organometal. Chem. 303, 213–220 (1986) were added sequentially and polymerization was initiated. Thirty minutes later, the polymerization was terminated by adding 10 mL of ethanol. A white solid precipitated by adding the polymerization reaction solution into a large amount of ethanol was filtrated and dried in vacuo over night to obtain 3 g of an ethylene-vinylcyclohexane copolymer having a vinylcyclohexane content "m" of 1.5 mol %, a melting temperature Tm of 118.0, a MI of 22 g/10 minutes, and a SR of 1.06. The results are shown in Table 2.

COMPARATIVE EXAMPLE 5

Polymerization was conducted in the same manner as in Example 1 except that the charging amount of vinylcyclohexane was changed to 12 mL. As a result of the polymerization, 63 g of an ethylene-vinylcyclohexane copolymer was obtained having a vinylcyclohexane content of 0.4 mol %, a Tm of 124.0° C., a MI of 1.4 g/10 minutes, a SR of 1.09, and a Mw/Mn of 1.8. The results are shown in Table 2.

EXAMPLE 4

Polymerization was conducted in the same manner as in Example 1 except that 5 μmol of isopropylidene (cyclopentadienyl)(3-tert-butyl-5-methyl-2-phenoxy) titanium dichloride synthesized according to a method described in Example 1 in JP-A No. 9-87313 was used instead of dimethylsilylene(tetramethylcyclopentadienyl)(3-tert-butyl-5-methyl-2-phenoxy)titanium dichloride, and in addition, the charging amount of dimethylaniliniumtetrakis (pentafluorophenyl) borate was changed to 14 μmol. the charging amount of hydrogen was changed to 0 mL and the reaction temperature was changed to 60° C. As a result of the polymerization, 58 g of an ethylene-vinylcyclohexane copolymer was obtained having a vinylcyclohexane content "m" of 3.0 mol %, a Tm of 110.6° C., a MI of 6.2 g/10 minutes, a SR of 1.29, and a Mw/Mn of 2.0. The results are shown in Table 3.

COMPARATIVE EXAMPLE 6

Polymerization was conducted in the same manner as in Example 4 except that the charging amount of 1-hexene as an addition polymerizable monomer was changed to 19 mL, the charging amount of hydrogen was changed to 0 mmHg and the polymerization time was changed to 10 minutes. As a result of the polymerization, 43 g of an ethylene-1-hexene copolymer was obtained having a 1-hexene content of 3.0 mol %, a Tm of 108.1° C., a MI of 1.3 g/10 minutes, a SR of 1.31, and a Mw/Mn of 1.8. The results are shown in Table 3.

As shown in Tables 1, 2 and 3, ethylene-based copolymers of the present invention are extremely excellent in mechanical nature represented by tensile impact strength and transparency represented by haze as compared with an ethylene-1-hexene copolymer having equivalent molecular weight, melting temperature and fusion heat quantity.

EXAMPLE 5

Polymerization was conducted in the same manner as in Example 1 except that the charging amount of hydrogen was changed to 197 mL. As a result of the polymerization, 55 g of an ethylene/vinylcyclohexane copolymer was obtained having a melt viscosity $\eta^*_{190}$ of $1.53 \times 10^3$ Pa·s, a fusion heat quantity ΔH of 115 kJ/kg, a melting temperature of 111.7° C., and a Mw/Mn of 1.8. The resulted ethylene-based copolymer had a tensile impact strength of 2430 kJ/m² and a melt tension of 1.0 cN. The results are shown in Table 4.

EXAMPLE 6

Polymerization was conducted in the same manner as in Example 5 except that the charging amount of hydrogen was changed to 72 mL and the polymerization time was changed to 6 minutes. As a result of the polymerization, 60 g of an ethylene/vinylcyclohexane copolymer was obtained having a melt viscosity $\eta^*_{190}$ of $2.15 \times 10^3$ Pa·s, a fusion heat quantity $\Delta H$ of 112 kJ/kg, a melting temperature of 111.5° C., and a Mw/Mn of 1.8. The resulted ethylene-based copolymer had a tensile impact strength of 2630 kJ/m² and a melt tension of 1.5 cN. The results are shown in Table 4.

As shown in Table 4, ethylene-based copolymers of the present invention are extremely excellent in mechanical nature represented by tensile impact strength as compared with an ethylene-1-hexene copolymer having equivalent melt viscosity and fusion heat quantity.

EXAMPLE 7

An autoclave equipped with a stirrer having an internal volume of 5 liter was evacuated, then, 2 liter of hexane as a solvent and 40 mL of vinylcyclohexane as an addition polymerizable monomer were charged, and the reaction vessel was heated to 70° C. Subsequently, ethylene was fed while controlling the feeding rate at 1.2 MPa, and after stabilization inside the system, 1.5 mmol of triisobutylaluminum, 5 µmol of isopropylidene (cyclopentadienyl)(3-tert-butyl-5-methyl-2-phenoxy) titanium dichloride and 14 µmol of dimethylaniliniumtetrakis(pentafluorophenyl) borate were added sequentially and polymerization was initiated. Five minutes later, the polymerization was terminated by adding 10 mL of ethanol. A white solid precipitated by adding the polymerization reaction solution into a large amount of ethanol was filtrated and dried in vacuo over night to obtain 40 g of an ethylene/vinylcyclohexane copolymer having a melt viscosity $\eta^*_{190}$ of $0.774 \times 10^3$ Pa·s, a fusion heat quantity $\Delta H$ of 123 kJ/kg, a melting temperature of 112.7° C., and a Mw/Mn of 2.1. The resulted ethylene-based copolymer had a tensile impact strength of 1140 kJ/m² and a melt tension of 2.1 cN. The results are shown in Table 5.

EXAMPLE 8

Polymerization was conducted in the same manner as in Example 7 except that the polymerization temperature was changed to 60° C. As a result of the polymerization, 40 g of an ethylene/vinylcyclohexane copolymer was obtained having a melt viscosity $\eta^*_{190}$ of $1.22 \times 10^3$ Pa·s, a fusion heat quantity $\Delta H$ of 122 kJ/kg, a melting temperature of 113.3° C., and a Mw/Mn of 2.1. The resulted ethylene-based copolymer had a tensile impact strength of 1240 kJ/m² and a melt tension MT of 5.7 cN. The results are shown in Table 5.

EXAMPLE 9

Polymerization was conducted in the same manner as in Example 7 except that 0.0547 MPa of hydrogen was charged, 11 mL of 1-hexene and 3 mL of 1,5-hexadiene were charged as addition polymerizable monomers instead of vinylcyclohexane, and 1.5 µmol of dimethylsilylene (tetramethylcyclopentadienyl)(3-tert-butyl-5-methyl-2-phenoxy)titanium dichloride instead of isopropylidene (cyclopentadienyl)(3-tert-butyl-5-methyl-2-phenoxy) titanium dichloride, and 7.5 µmol of dimethylaniliniumtetrakis(pentafluorophenyl) borate were used, the charging temperature was changed to 80° C. and the polymerization time was changed to 6 minutes. As a result of the polymerization, 53 g of an ethylene/1-hexene/1,5-hexadiene ternary copolymer was obtained having a melt viscosity $\eta^*_{190}$ of $1.20 \times 10^3$ Pa·se, a fusion heat quantity $\Delta H$ of 123 kJ/kg, a melting temperature of 113° C., and a Mw/Mn of 2.2. The resulted ethylene-based copolymer had a tensile impact strength TI of 890 kJ/m² and a melt tension MT of 7.2 cN The results are shown in Table 5.

COMPARATIVE EXAMPLE 7

Polymerization was conducted in the same manner as in Example 9 except that 14 mL of 1-hexene as an addition polymerizable monomer was charged, the charging amount of hydrogen was changed to 210 mmHg, and the polymerization time was changed to 10 minutes. As a result of the polymerization, 106 g of an ethylene/1-hexene copolymer was obtained having a melt viscosity $\eta^*_{190}$ of $2.19 \times 10^3$ Pa·s, a fusion heat quantity a H of 124 kJ/kg, a melting temperature of 114.5° C., and a Mw/Mn of 1.8. The resulted ethylene-based copolymer had a tensile impact strength TI of 1950 kJ/m² and a melt tension of 1.4 cN. The results are shown in Table 6.

COMPARATIVE EXAMPLES 8, 9

The results of measuring physical properties of Sumikathene a FZ201-0 and Sumikathene F200 obtained by a high pressure radical method, manufactured by Sumitomo Chemical Co., Ltd., are summarized in Table 6.

As shown in Table 1, ethylene-based copolymers of the present invention are extremely excellent in mechanical nature represented by tensile impact strength and molding processability represented by melt tension as compared with an ethylene/1-hexene copolymer having equivalent melt viscosity and fusion heat quantity.

TABLE 1

|  | Example 1 | Example 2 | Example 3 |
|---|---|---|---|
| Catalyst component, Resin grade | Complex I | Complex I | Complex I |
| Vinyl compound (A) | Vinylcyclohexane | Vinylcyclohexane | Vinylcyclohexane |
| Es/B1 | −2.03/1.91 | −2.03/1.91 | −2.03/1.91 |
| Content, mol % | 2.6 | 4.0 | 0.5 |
| Addition polymerizable monomer other than A | — | — | 1-Hexene |
| Content, mol % | — | — | 2.1 |
| Monomer other than the above-described monomers | — | — | — |
| Es/B1 | — | — | — |
| Content, mol % | — | — | — |
| Mw/Mn | 1.8 | 1.8 | 1.8 |
| Melting temperature Tm, ° C. | 111.8 | 104.8 | 111.5 |
| Melt heat quantity H, kJ/kg | 114 | 96 | 118 |
| MI g/10 min. | 2.6 | 5.3 | 1.45 |
| SR | 1.09 | 1.07 | 1.10 |
| Tensile impact TI, kJ/m² | 2530 | 2820 | 2580 |
| Value of right side of formula (16) | 2186 | 2432 | 2307 |

Complex I: dimethylsilylene(tetramethylcyclopentadienyl)(3-tert-butyl-5-methyl-2-phenoxy)titanium dichloride Right side of formula (16): −30×H−950×logMI+6000

TABLE 2

|  | Comparative example 1 | Comparative example 2 | Comparative example 4 | Comparative example 5 |
|---|---|---|---|---|
| Catalyst component, Resin grade | Complex I | Complex I | Complex II | Complex I |
| Vinyl compound (A) | — | — | Vinylcyclohexane | Vinylcyclohexane |

TABLE 2-continued

|  | Comparative example 1 | Comparative example 2 | Comparative example 4 | Comparative example 5 |
|---|---|---|---|---|
| Es/B1 | — | — | −2.03/1.91 | −2.03/1.91 |
| Content, mol % | — | — | 1.5 | 0.4 |
| Addition polymerizable monomer other than A | 1-Hexene | — | — | — |
| Content, mol % | 2.5 | — | — | — |
| Monomer other than the above-described monomers | — | 4-Methyl-pentene | — | — |
| Es/B1 | — | −2.17/1.52 | — | — |
| Content, mol % | — | 1.6 | — | — |
| Mw/Mn | 1.8 | 1.7 | 2.0 | 1.8 |
| Melting temperature Tm, °C. | 111.8 | 113.2 | 118.0 | 124.0 |
| Melt heat quantity H, kJ/kg | 117 | 121 | 135 | 160 |
| MI g/10 min. | 2.7 | 2.1 | 22 | 1.4 |
| SR | 1.07 | 1.08 | 1.06 | 1.09 |
| Tensile impact TI, kJ/m$^2$ | 2010 | 1890 | 60 | 1000 |
| Value of right side of formula (16) | 2080 | 2064 | 675 | 1061 |

Complex I: dimethylsilylene(tetramethylcyclopentadienyl)(3-tert-butyl-5-methyl-2-phenoxy)titanium dichloride Complex II: bis(tert-butyl-cycloentadienyl)zirconium dichloride Right side of formula (16): −30×H−950×logMI+6000

TABLE 3

|  | Example 4 | Comparative example 6 |
|---|---|---|
| Catalyst component, Resin grade | Complex III | Complex III |
| Vinyl compound (A) | Vinylcyclohexane | — |
| Es/B1 | −2.03/1.91 | — |
| Content, mol % | 3.0 | — |
| Addition polymerizable monomer other than A | — | 1-Hexene |
| Content, mol % | — | 3.0 |
| Mw/Mn | 2.0 | 1.8 |
| Melting temperature Tm, °C. | 110.6 | 108.1 |
| MI g/10 min. | 6.2 | 1.3 |
| SR | 1.29 | 1.31 |
| Tensile impact TI, kJ/m$^2$ | 1300 | 1870 |
| Value of right side of formula (17) | 872 | 1918 |

Complex III: isoropylidene(cyclopentadienyl)(3-tert-butyl-5-methyl-2-phenoxy)titanium dichloride Right side of formula (17): −79×Tm−1250×logMI+10600

TABLE 4

|  | Example 5 | Example 6 | Comparative example 1 |
|---|---|---|---|
| Catalyst component, Resin grade | Complex I | Complex I | Complex I |
| Copolymerization component | Vinylcyclohexane | Vinylcyclohexane | 1-Hexene |
| Es/B1 | −2.03/1.91 | −2.03/1.91 | −1.63/1.52 |
| Mw/Mn | 1.8 | 1.8 | 1.8 |
| $\eta^*_{190}$ Pa·s | 1530 | 2150 | 1950 |
| Melt heat quantity ΔH, kJ/kg | 115 | 112 | 117 |
| Tensile impact strength TI, kJ/m$^2$ | 2430 | 2630 | 2010 |
| Value of right side of formula (2) | 2013 | 2319 | 2128 |
| Melt tension MT, cN | 1.0 | 1.5 | 1.1 |
| Value of right side of formula (3) | 5.2 | 9.0 | 7.8 |

Complex I: dimethylsilylene(tetramethylcyclopentadienyl)(3-tert-butyl-5-methyl-2-phenoxy)titanium dichloride Right side of formula (2): −31×ΔH+1.57×10$^4$×log $\eta^*_{190}$−980

Right side of formula (3): 6.2×10$^{-3}$×log $\eta^*_{190}$−4.3

TABLE 5

|  | Example 7 | Example 8 | Example 9 |
|---|---|---|---|
| Catalyst component | Complex III | Complex III | Complex I |
| Copolymerization component | Vinylcyclohexane | Vinylcyclohexane | 1-Hexene |
| Es/B1 | −2.03/1.91 | −2.03/1.91 | — |
| Other copolymerization component | — | — | 1,5-hexadiene |
| Mw/Mn | 2.1 | 2.1 | 2.2 |
| $\eta^*_{190}$ Pa·s | 744 | 1220 | 1200 |
| Melt heat quantity ΔH, kJ/kg | 123 | 122 | 123 |
| Tensile impact strength TI, kJ/m$^2$ | 1140 | 1240 | 890 |
| Value of right side of formula (4) | 589 | 765 | 747 |
| Melt tension MT, cN | 2.1 | 5.7 | 7.2 |
| Value of right side of formula (5) | 0.3 | 3.3 | 3.1 |

Complex I: dimethylsilylene(tetramethylcyclopentadienyl)(3-tert-butyl-5-methyl-2-phenoxy)titanium dichloride Complex III: isopropylidene(cyclopentadienyl)(3-tert-butyl-5-methyl-2-phenoxy)titanium dichloride Right side of formula (4): −15×ΔH+0.76×10$^4$×log $\eta^*_{\#-}$470

Right side of formula (5): 6.2×10$^{-3}$×log $\eta^*_{\#}$−4.3

TABLE 6

|  | Comparative example 6 | Comparative example 7 | Comparative example 8 | Comparative example 9 |
|---|---|---|---|---|
| Catalyst component | Complex III | Complex I | FZ201-0 | F200 |
| Copolymerization component | 1-Hexene | 1-Hexene | 1-Hexene | — |
| Es/B1 | −1.63/1.52 | — | — | — |
| Other copolymerization component | — | — | — | — |
| Mw/Mn | 1.8 | 1.8 | — | — |
| $\eta^*_{190}$ Pa·s | 1650 | 2190 | 1448 | 714 |
| Melt heat quantity ΔH, kJ/kg | 111.5 | 124 | 100 | 119 |
| Tensile impact strength TI, kJ/m$^2$ | 1870 | 1950 | 1510 | 180 |
| Value of right side of formula (4) | 1063 | 925 | 1192 | 674 |
| Melt tension MT, cN | 3.9 | 1.4 | 2.1 | 9.3 |
| Value of right side of formula (5) | 5.9 | 9.2 | 4.7 | 0.1 |

Complex I: dimethylsilylene(tetramethylcyclopentadienyl)(3-tert-butyl-5-methyl-2-phenoxy)titanium dichloride Complex III: isopropylidene(cyclopentadienyl)(3-tert-butyl-5-methyl-2-phenoxy)titanium dichloride Right side of formula (4): $-15 \times \Delta H + 0.76 \times 10^4 \times \log \eta^*_{190} - 470$ Right side of formula (5): $6.2 \times 10^{-3} \times \log \eta^*_{190} - 4.3$

What is claimed is:

1. An ethylene-based polymer comprising ethylene and at least one addition polymerizable monomer containing a vinyl compound (A) described below, wherein the ethylene-based polymer has a melting temperature (Tm) of 119° C. or lower and, the melt index MI (g/10 minutes) of the ethylene-based polymer and the molar content "m" (mole %) of the vinyl compound (A) satisfy the following formula (1):

Vinyl compound (A): a vinyl compound represented by the structural formula $CH_2=CH-R$ containing a saturated hydrocarbon group R wherein the substituent R has a steric parameter Es of not less than −2.77 and not more than −1.64 and the substituent R has a steric parameter B1 of not less than 1.53 and not more than 2.90:

$$0.01 \leq MI \leq 18 + m^{1.4} \quad (1).$$

2. The ethylene-based polymer according to claim 1, wherein the ethylene-based polymer is an ethylene-vinyl compound binary copolymer comprising ethylene and the vinyl compound (A).

3. The ethylene-based polymer according to claim 1, wherein the ethylene-based polymer is an ethylene-vinyl compound-addition polymerizable monomer ternary copolymer comprising ethylene, the vinyl compound (A) and an addition polymerizable monomer other than the vinyl compound (A).

4. The ethylene-based polymer according to claim 1, wherein the vinyl compound (A) is vinylcyclohexane.

5. An ethylene-based polymer wherein the polymer has a melt viscosity $\eta^*_{190}$ at a temperature of 190° C. and at a shearing speed of 100 rad/sec in the range from $3.0 \times 10^2$ to $6.0 \times 10^3$ Pa·s, the polymer has a fusion heat quantity $\Delta H$ in the range from 70 to 145 J/g, and the tensile impact strength TI (kJ/m²) and the melt tension MT (cN) at a temperature of 150° C. satisfy the following formulae (2) and (3):

$$TI \geq -31 \times \Delta H + 1.57 \times 10^4 \times \log \eta^*_{190} - 980 \quad (2),$$

$$MT < 6.2 \times 10^{-3} \times \log \eta^*_{190} - 4.3 \quad (3).$$

6. The ethylene-based polymer according to claim 1 or 5, wherein the polymer is produced in the presence of a catalyst comprising a transition metal compound having indenyl-type anion skeleton or cross-linked cyclopentadiene-type anion skeleton.

7. An ethylene-based polymer wherein the polymer has a melt viscosity $\eta^*_{190}$ at a temperature of 190° C. and at a shearing speed of 100 rad/sec in the range from $3.0 \times 10^2$ to $6.0 \times 10^3$ Pa·s, the polymer has a fusion heat quantity $\Delta H$ in the range from 70 to 145 kJ/kg, and the tensile impact strength TI (kJ/m²) and the melt tension MT (cN) at a temperature of 150° C. satisfy the following formulae (4) and (5):

$$TI \geq -15 \times \Delta H + 0.76 \times 10^4 \times \log \eta^*_{190} - 470 \quad (4),$$

$$MT \geq 6.2 \times 10^{-3} \times \log \eta^*_{190} - 4.3 \quad (5).$$

8. The ethylene-based polymer according to claim 7, wherein the polymer is produced in the presence of a catalyst comprising a transition metal compound having cyclopentadiene-type anion skeleton.

9. The ethylene-based polymer according to claim 1, 5 or 7, wherein the polymer is produced in the presence of a catalyst comprising a transition metal compound having a group having cyclopentadiene-type anion skeleton represented by the following general formula [I], [II] or [III]:

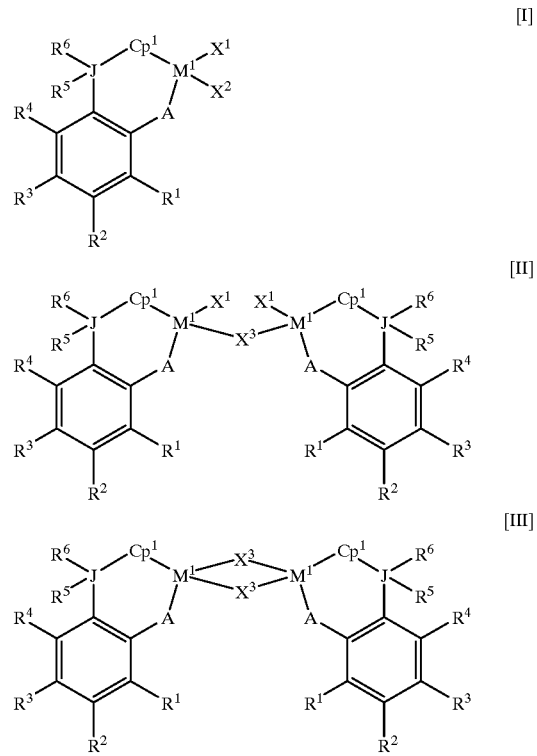

(in the above-described general formulae [I] to [III], $M^1$ represents a IV group transition metal atom in the periodic table of element, Are presents a XVI group atom in the periodic table of element, and J represents a XIV group atom in the periodic table of element, $Cp^1$ represents a group having cyclopentadiene-type anion skeleton, Each of $X^1$, $X^2$, $R^1$, $R^2$, $R^3$, $R^4$, $R^5$ and $R^6$ independently represents a hydrogen atom, halogen atom, alkyl group, aralkyl group, aryl group, substituted silyl group, alkoxy group, aralkyloxy group, aryloxy group or disubstituted amino group, $X^3$ represents a XVI group atom in the periodic table of element, $R^1$, $R^2$, $R^3$, $R^4$, $R^5$ and $R^6$ may optionally bond to form a ring, two of $M^1$, A, J, $Cp^1$, $X^1$, $X^2$, $X^3$, $R^1$, $R^2$, $R^3$, $R^4$, $R^5$ and $R^6$ in the general formula [II] or [III] may be the same or different).

10. A method for producing an ethylene-based polymer, wherein the ethylene-based polymer according to claim 1 or 5 is produced in the presence of a catalyst comprising a transition metal compound having indenyl-type anion skeleton or cross-linked cyclopentadiene-type anion skeleton.

11. A method for producing an ethylene-based polymer, wherein the ethylene-based polymer according to claim 7 is produced in the presence of a catalyst comprising a transition metal compound having cyclopentadiene-type anion skeleton.

12. A method for producing an ethylene-based polymer, wherein the ethylene-based polymer according to claim 1, 5 or 7 is produced in the presence of a catalyst comprising a transition metal compound having cyclopentadiene-type anion skeleton represented by the following general formula [I] [II] or [III]:

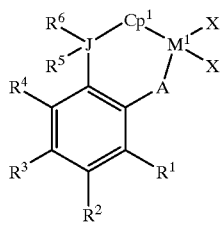
[I]

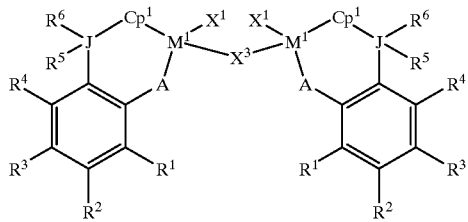
[II]

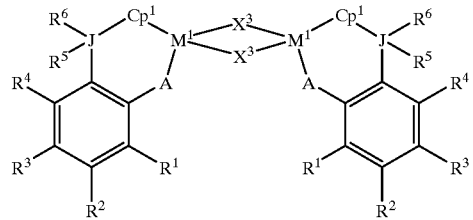
[III]

(in the above-described general formulae [I] to [III], $M^1$ represents a IV group transition metal atom in the periodic table of element, A represents a XVI group atom in the periodic table of element, and J represents a XIV group atom in the periodic table of element, $Cp^1$ represents a group having cyclopentadiene-type anion skeleton, each of $X^1$, $X^2$, $R^1$, $R^2$, $R^3$, $R^4$, $R^5$ and $R^6$ independently represents a hydrogen atom, alkyl group, aralkyl group, aryl group, substitute silyl group, alkoxy group, aralkyloxy group, aryloxy or disubstituted amino group, $X^3$ represents a XVI group atom in the periodic table of element, $R^1$, $R^2$, $R^3$, $R^4$, $R^5$ and $R^6$ may optionally bond to form a ring, two of $M^1$, A, J, $Cp^1$, $X^1$, $X^2$, $X^3$, $R^1$, $R^2$, $R^3$, $R^4$, $R^5$ and $R^6$ in the general formula [II] or [III] may be the same or different).

13. A film or sheet made of the ethylene-based polymer according to claim 1, 5 or 7.

14. A molded article made of the ethylene-based polymer claim 1, 5 or 7.

* * * * *